United States Patent [19]
Ichikawa

[11] Patent Number: 5,523,765
[45] Date of Patent: Jun. 4, 1996

[54] METHOD AND APPARATUS FOR DETECTING VEHICLE LOCATION FOR A VEHICLE NAVIGATION SYSTEM

[75] Inventor: Shigeru Ichikawa, Iwaki, Japan

[73] Assignee: Alpine Electronics, Inc., Tokyo, Japan

[21] Appl. No.: 255,617

[22] Filed: Jun. 9, 1994

[30] Foreign Application Priority Data

Jun. 10, 1993 [JP] Japan ..................... 5-138250

[51] Int. Cl.⁶ .............................. G01S 3/02; G01S 5/02; G06F 7/70; G01C 21/00
[52] U.S. Cl. .......................... 342/451; 342/357; 342/457; 364/424.02; 364/449
[58] Field of Search ..................... 342/357, 451, 342/457; 364/424.01, 424.02, 449; 340/995

[56] References Cited

U.S. PATENT DOCUMENTS

| | | | |
|---|---|---|---|
| 4,796,191 | 1/1989 | Honey et al. | 364/450 |
| 5,311,173 | 5/1994 | Komura et al. | 340/995 |
| 5,359,529 | 10/1994 | Snider | 364/449 |
| 5,416,712 | 5/1995 | Geier et al. | 364/450 |

Primary Examiner—Gregory C. Issing
Attorney, Agent, or Firm—Guy W. Shoup; Norman R. Klivans; Patrick T. Bever

[57] ABSTRACT

Accurate detection of an existing link (current road location between two road nodes) of a vehicle by an on-board navigation system. Upon each periodic detection of the position, azimuth and velocity of the vehicle by a GPS receiver, all the links within a predetermined distance of the vehicle position are extracted by looking up road data read out from a CD-ROM. For each of the links, the distance from the vehicle position, the angle with the vehicle azimuth, the angle between the vehicle azimuth and a passable direction of the link, the difference between the vehicle velocity and the speed limit for the link and the connectability with the last-detected existing link are obtained and are substituted into a predetermined existential probability evaluation function to calculate an existential probability. The link with the largest existential probability is determined to be the existing link. This existing link and guide route data in a guide route memory are collated to determine any deviation from the guided route. If a deviation has occurred, a warning character sequence pattern is generated and displayed on a map image on a screen.

22 Claims, 19 Drawing Sheets

| ADDRESS | |
|---|---|
| F000 | START POINT DATA (NODE Ns) |
| F001 | NODE $N_1$ |
| F002 | NODE $N_2$ |
| | ⋮ |
| FFFF | DESTINATION DATA (NODE No.) |

19 — GUIDE ROUTE MEMORY

— ··· GUIDE ROUTE
● ··· NODE

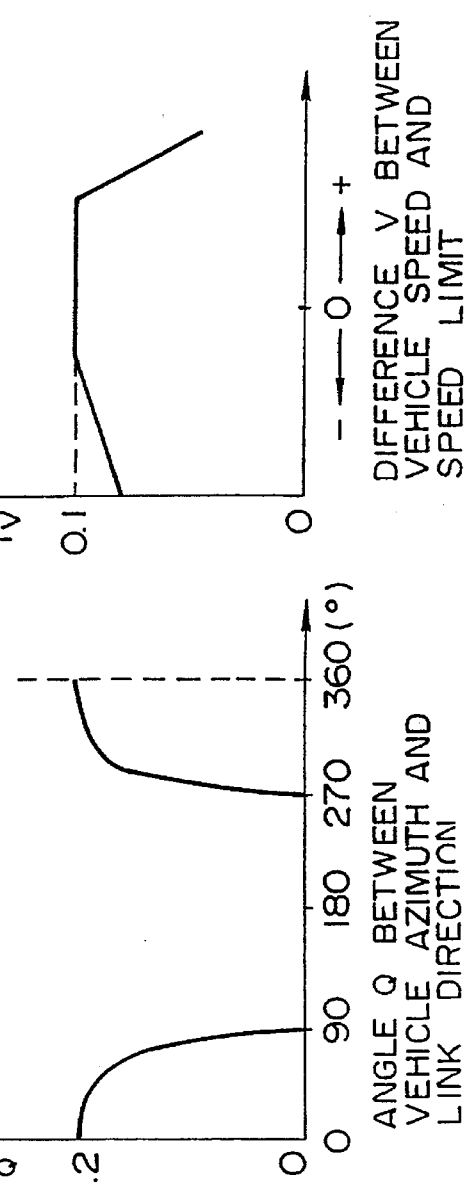
FIG. 4(1)
FIG. 4(2)
FIG. 4(3)
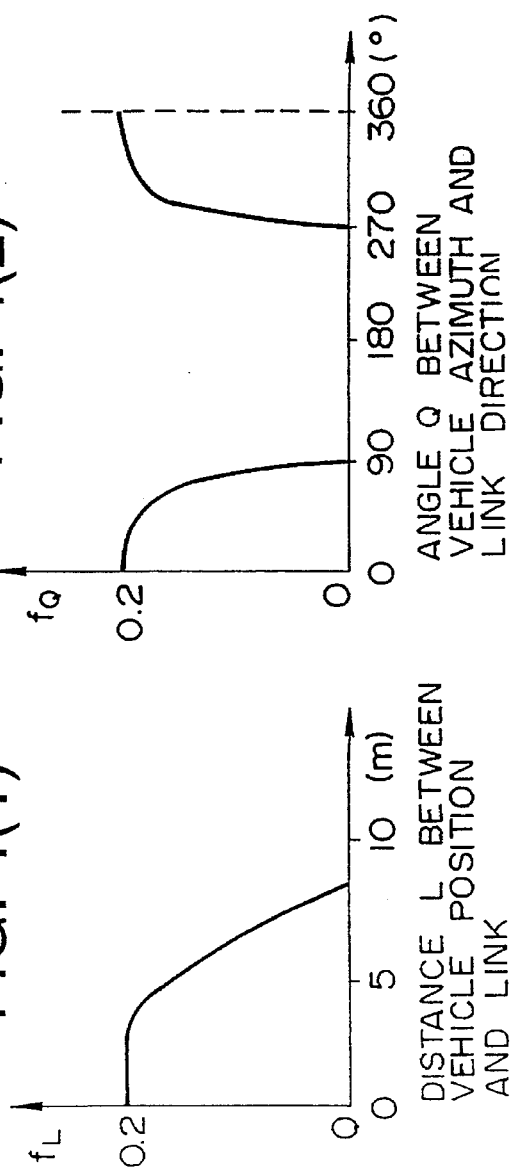
FIG. 4(4)
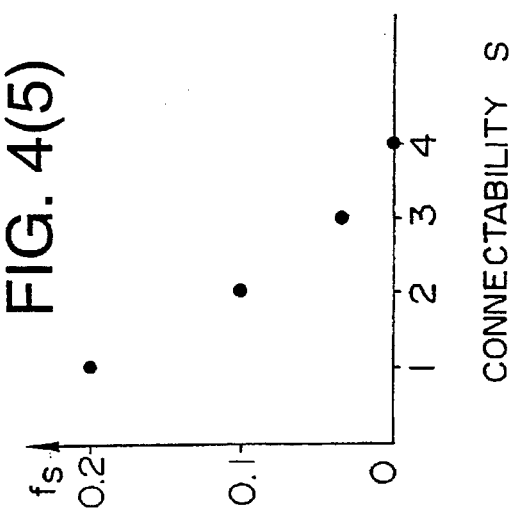
FIG. 4(5)
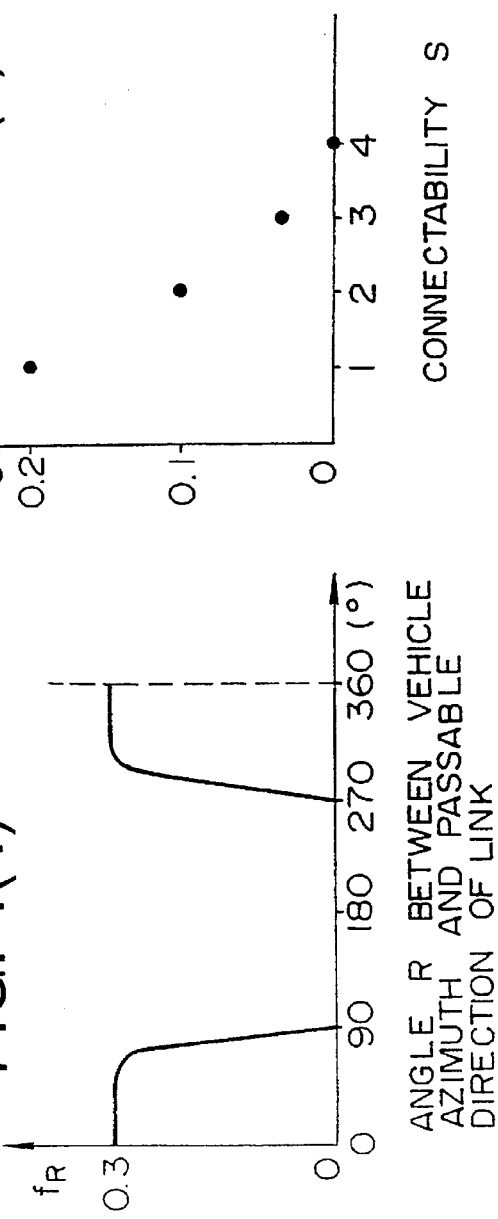

FIG. 5

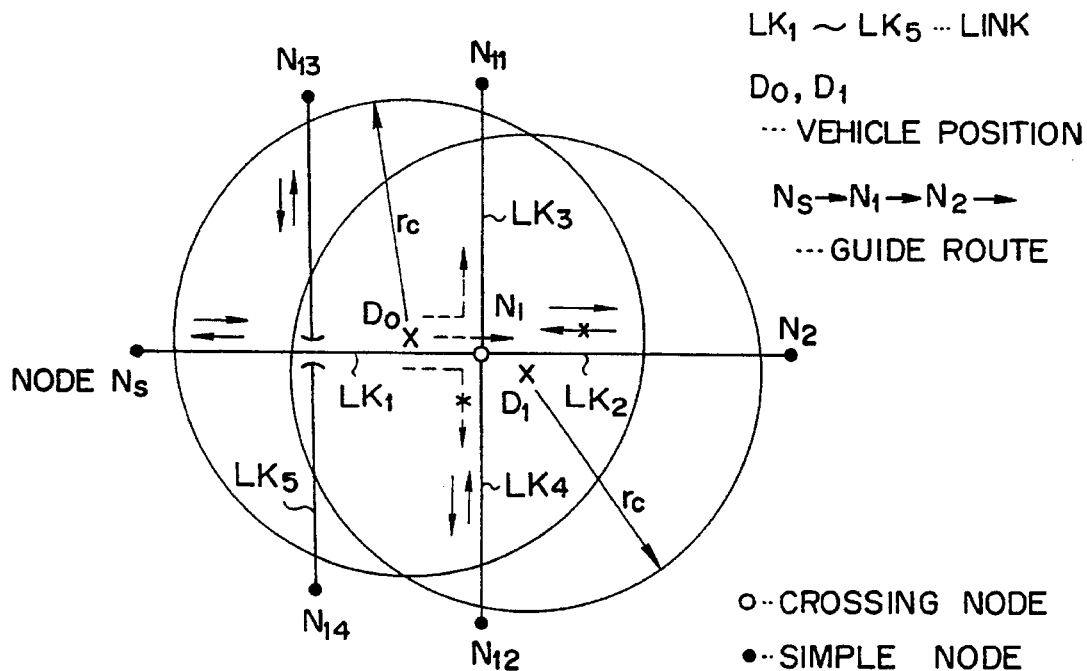

$LK_1 \sim LK_5$ ··· LINK $D_0, D_1$
··· VEHICLE POSITION $N_S \rightarrow N_1 \rightarrow N_2 \rightarrow$
··· GUIDE ROUTE

○ ··CROSSING NODE
● ··SIMPLE NODE

⟶  TRAVELING IS PERMITTED BY TRAFFIC CONTROL DATA

—*—  TRAVELING IS PROHIBITED BY TRAFFIC CONTROL DATA

--▸  TRAVELING IS PERMITTED BY CROSSING TRAFFIC CONTROL DATA

-*-  TRAVELING IS PROHIBITED BY CROSSING TRAFFIC CONTROL DATA

NO TRAFFIC CONTROL DATA EXISTS FOR LINK $LK_3$

CONNECTABILITY FROM $LK_1$ TO $LK_2$ IS "1"

CONNECTABILITY FROM $LK_1$ TO $LK_3$ IS "2"

CONNECTABILITY FROM $LK_1$ TO $LK_4$ IS "3"

CONNECTABILITY FROM $LK_1$ TO $LK_5$ IS "4"

○ --- CROSSING NODE

● --- SIMPLE NODE $LK_1 \sim LK_{11}$ --- LINK $D_2 \sim D_5$ --- VEHICLE POSITION $N_S \rightarrow N_1 \rightarrow N_2 \rightarrow N_3 \rightarrow N_4 \rightarrow$
 --- GUIDE ROUTE

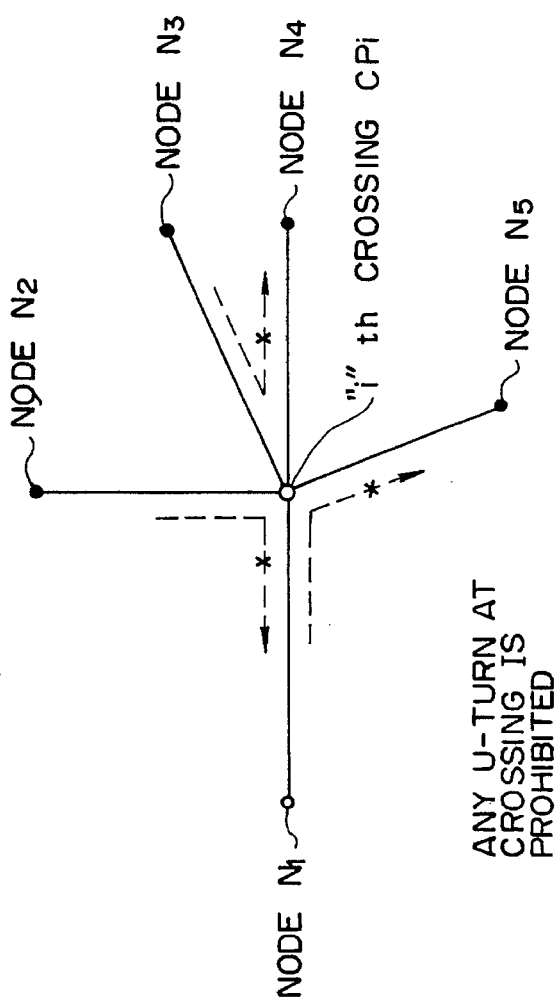
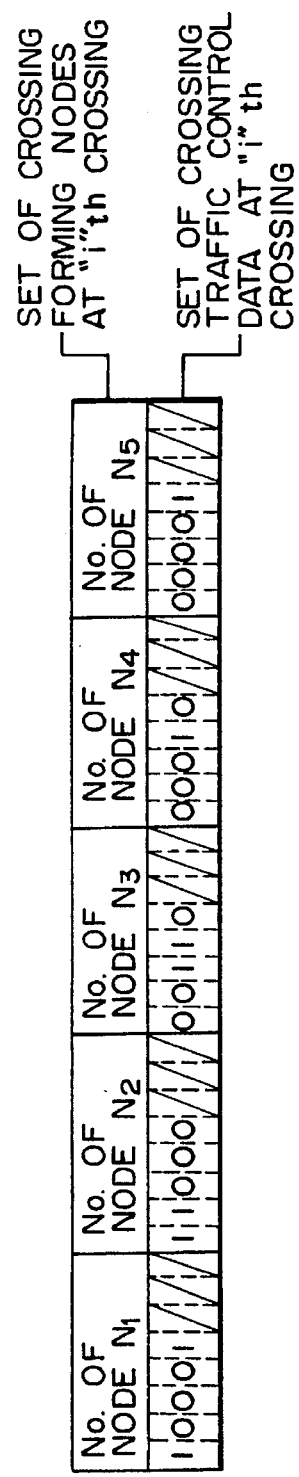
FIG.19

○ --- CROSSING NODE

● --- SIMPLE NODE
(NODE LACKING CROSSING IDENTIFICATION FLAG)

METHOD AND APPARATUS FOR DETECTING VEHICLE LOCATION FOR A VEHICLE NAVIGATION SYSTEM

BACKGROUND OF THE INVENTION

1. Field of the Invention

The present invention relates to methods for detecting a present position of a vehicle and, more particularly, relates to detecting the vehicle position in an on-vehicle navigation system.

2. Description of the Related Art

An on-vehicle navigation system provides guidance for the driver of the vehicle to make it easier for the driver to arrive at his desired destination. In such a navigation system, the position of the vehicle is detected and map data at the vicinity of the vehicle position is read from a CD-ROM. The resulting map image is stored in a video RAM and a vehicle position mark is superimposed on a predetermined position on the map image. The image in the video RAM is output to a CRT display as a picture signal. As the current position changes with the movement of the vehicle, the vehicle position mark on the screen moves, or the vehicle position mark is fixed at the center of the screen while the map is scrolled, so that the map in the vicinity of the vehicle position can be viewed at all times.

The map data stored in the CD-ROM is divided into regions of suitable longitudinal and latitudinal widths corresponding to a reduced scale. Roads are each indicated by a set of vertices (nodes) which are represented by longitude-latitude coordinates. A road portion connecting two nodes is referred to herein as a "link". The road data contained in each map, as shown in FIG. 17, includes a road list RDLT, a node table NDTB and a crossing constituting node list CRLT. Of these, the road list RDLT contains, for each road, data for: the number of all the nodes on that road; the ordinal number on the node table NDTB of each of the nodes forming a link; the road width between the respective nodes; the speed limit between the respective nodes; traffic control flags between the nodes; the name of the road; the type of the road; etc. Data for road width, speed limit and traffic control as shown in FIG. 18 are the information concerning the link which connects the relevant node to the next node. The traffic control data consists of two bits, where the high order bit is "1" when traveling from that node to the next node is prohibited, while it is "0" when permitted. The low order bit is set to "1" when traveling from the next node to that node is prohibited, while it is set to "0" when permitted.

Further, the crossing constituting node list CRLT contains data for: a set of ordinal numbers, for each crossing in the map, on the node table NDTB of the nodes (referred to as crossing constituting nodes) at the other ends of the links which are connected to the crossing; and crossing traffic control data for indicating whether traveling from one crossing constituting node toward another crossing constituting node by way of the relevant crossing is regulated or not. Eight bits are assigned to each crossing constituting node as the crossing traffic control data. As shown in FIG. 19, in the "i"th (i=1 to 8) crossing traffic control data, the MSB (most significant bit) is set to "1" when traffic on the route from the "i"th crossing constituting node to the first crossing constituting node by way of the relevant crossing is prohibited, while it is set to "0" when permitted. The 2SB (second significant bit) is set to "1" when traffic on the route from the "i"th crossing constituting node to a second crossing constituting node by way of the relevant crossing is prohibited while it is set to "0" when permitted. Likewise, the nSB (nth significant bit) is set to "1" when traffic on the route from the "i"th crossing constituting node toward "n"th crossing constituting node by way of the relevant crossing is prohibited, while it is set to "0" when permitted. Accordingly, the LSB (least significant bit) is set to "1" when traffic on the route from the "i"th crossing constituting node toward the 8th crossing constituting node by way of the relevant crossing is prohibited, while it is set to "0" when permitted.

The node table NDTB is the list of all the nodes on the map. It contains, for each node: coordinate information (longitude-latitude); a crossing identification flag as to whether the node is a crossing or not; a pointer for pointing a location on the crossing constituting node list if it is a constituent of a crossing or for pointing a road to which the node (simple node) belongs if it is not a crossing; etc.

A known on-vehicle navigation system is provided with a route guiding function for guiding on the optimal route from a start point to a destination. In such route guiding, upon setting of a start point and a destination by the driver prior to the start of travel, the map data in the CD-ROM is looked up to perform a simulation calculation, for example, by means of the well known Dijkstra method or breadth first search. (See e.g. related and copending U.S. patent application Ser. No. 08/139,595, filed Oct. 19, 1993, docket no. ALPN-005, incorporated by reference.) For example, the optimal guided route for connecting the start point and the destination with a least traveling distance is obtained, and guided route data combining a node sequence forming the guided route, the start point data at the top and the destination data at the bottom is stored in a guide route memory.

Then, during travel, the node sequence in the guide route memory is searched for the guided route which is contained in the map area on the screen. The guide route is indicated for example by a thick line in a different color from the other roads, so that it is easy for the driver to see which one of the roads should be taken to arrive at his destination.

A known type of such an on-vehicle navigation system having a route guiding function uses map data during route guiding to detect a link where the vehicle is located currently (existing link) which is compared with the guide route data to monitor whether the vehicle has deviated from the guide route. If such a deviation has occurred, a warning message is displayed on the screen to warn the driver so that he may take steps to return to his desired route.

Also, there is a known system providing a route guide for the driver, for example, by displaying on a part of the screen a guide image for traveling through a crossing, where the structure of the crossing and the course to be taken toward the destination are indicated with respect to the crossing on the guide route ahead of the vehicle in its travel direction of travel. In such a system, the existing link and the guide route data are collated to determine whether the vehicle has traveled through the crossing which is currently the subject of guiding. If the crossing has been passed, the crossing guide image is switched to that of the next crossing on the guided route.

In the detection method of the existing link in such a conventional on-vehicle navigation system, supposing that the vehicle position D and the nearby links i are located as shown in FIG. 20, map matching based on a projection method is performed by looking up map data to find link g which is closest to the vehicle position D. Link g is then set as the existing link. In some cases, however, the vehicle actually is located on a link other than the link g due to a detection error of the vehicle position D or data error in forming the map data. The prior art systems suffer from erroneous determination of deviation from the guided route and of passing a crossing (cross road) which is a subject of the route guiding.

SUMMARY OF THE INVENTION

Accordingly, the present invention provides a method and related apparatus for detecting an existing link (current road location) of a vehicle, by which an accurate detection of the existing link is possible.

According to the present invention, the vehicle position, vehicle azimuth and vehicle velocity are periodically detected during travel. Upon each detection of the vehicle position, vehicle azimuth and vehicle velocity, all the links (road segments) within a certain distance from the detected vehicle position are extracted by looking up the road data. For each of the extracted links, the distance from the detected vehicle position to the link, the angle between the vehicle azimuth and the link or/and angle between the vehicle azimuth and the passable direction of the link, the speed difference between the vehicle velocity and the speed limit of the link, and the connectability between the last-detected existing link and the relevant link are obtained. These are substituted into a predetermined existential probability evaluation function to calculate an existential probability. The link with the largest existential probability is determined to be the existing link.

Thereby, the existing link is detected as being the link which is determined as being the most reasonable overall, not only in light of the relative position of the vehicle but also in light of other factors such as of the vehicle azimuth, vehicle velocity and the connectability with the last-detected existing link. It is thus possible to achieve extremely high detection accuracy.

BRIEF DESCRIPTION OF THE DRAWING

FIGS. 4(1) to 4(5) illustrate an evaluation function table stored in an evaluation function table memory.

FIG. 5 illustrates the existing link detection method.

FIG. 19 illustrates crossing traffic control data.

DETAILED DESCRIPTION OF THE INVENTION

Figure 1:
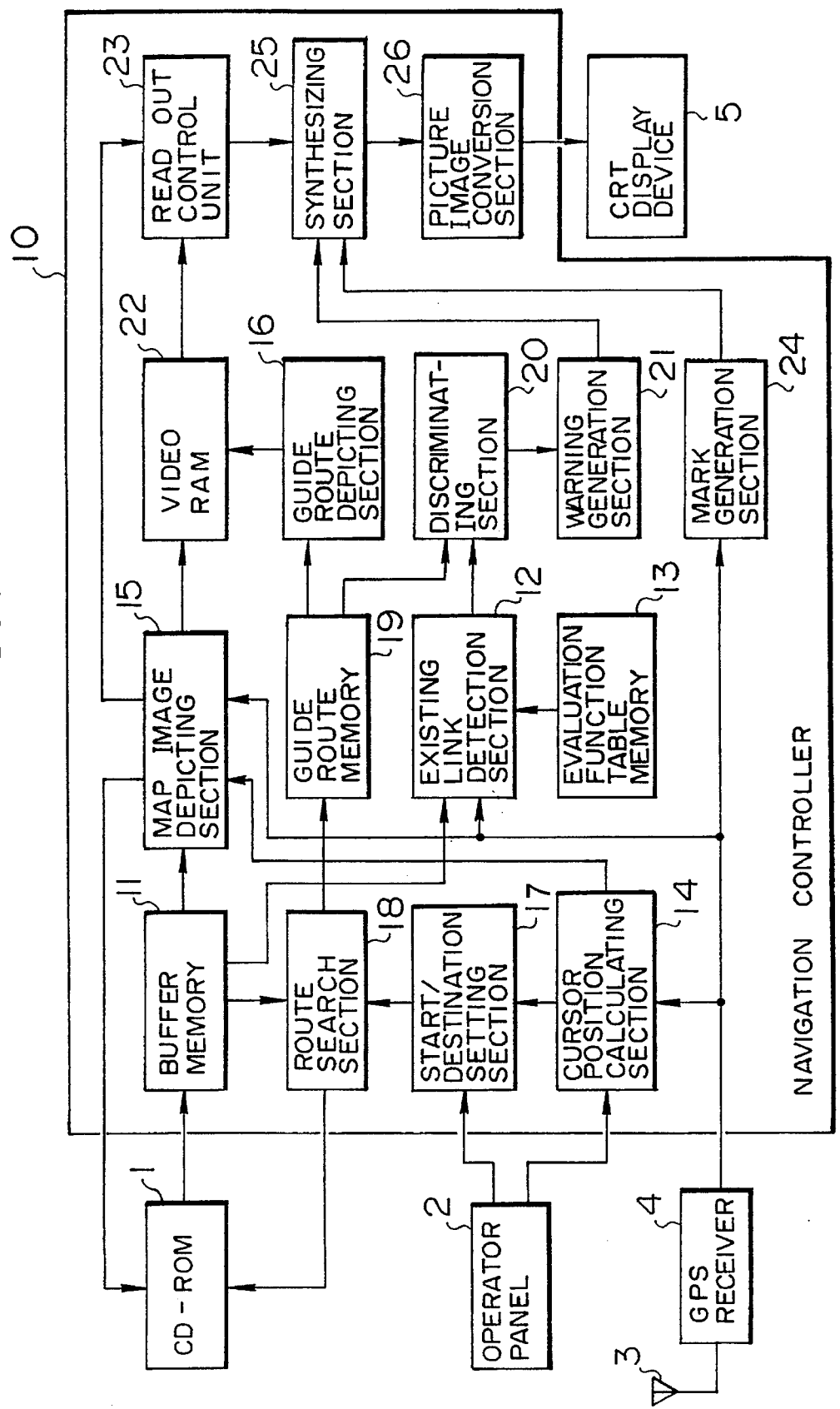
FIG. 1 shows in a block diagram the overall construction of an on-board navigation system for implementing the method for detecting the existing link of a vehicle according to the present invention.

FIG. 1 shows the overall construction of an on-vehicle navigation system for detecting an existing link of a vehicle according to the present invention. It is to be understood that the navigation controller in one embodiment is a central processing unit (plus other elements such as buffer memory 11) which executes a computer program. The execution of the computer program includes carrying out of the functions shown for each of the labelled sections of the navigation controller in FIG. 1.

In this figure, a CD-ROM stores map data and an operator panel 2 is provided with left, right, upward and downward cursor keys, a route guiding mode setting key, a start point setting key, a destination setting key, and keys for map search, scaling, etc. An antenna 3 receives satellite radio positioning signals from GPS (Global Positioning System) satellites and a conventional GPS receiver 4 periodically determines vehicle position, vehicle azimuth and vehicle velocity by means of conventional satellite navigation based on the satellite radio signals received at the antenna 3. (As is well known, the GPS satellites broadcast signals indicative of each satellite's orbit, location, etc. which require processing by the GPS receiver to determine the location of the GPS receiver on the surface of the earth.) A CRT display device 5 receives a picture signal and conventionally displays it on the CRT screen together with a cursor mark, a vehicle position mark, highlighted guide route, warning information, etc.

Figure 17:
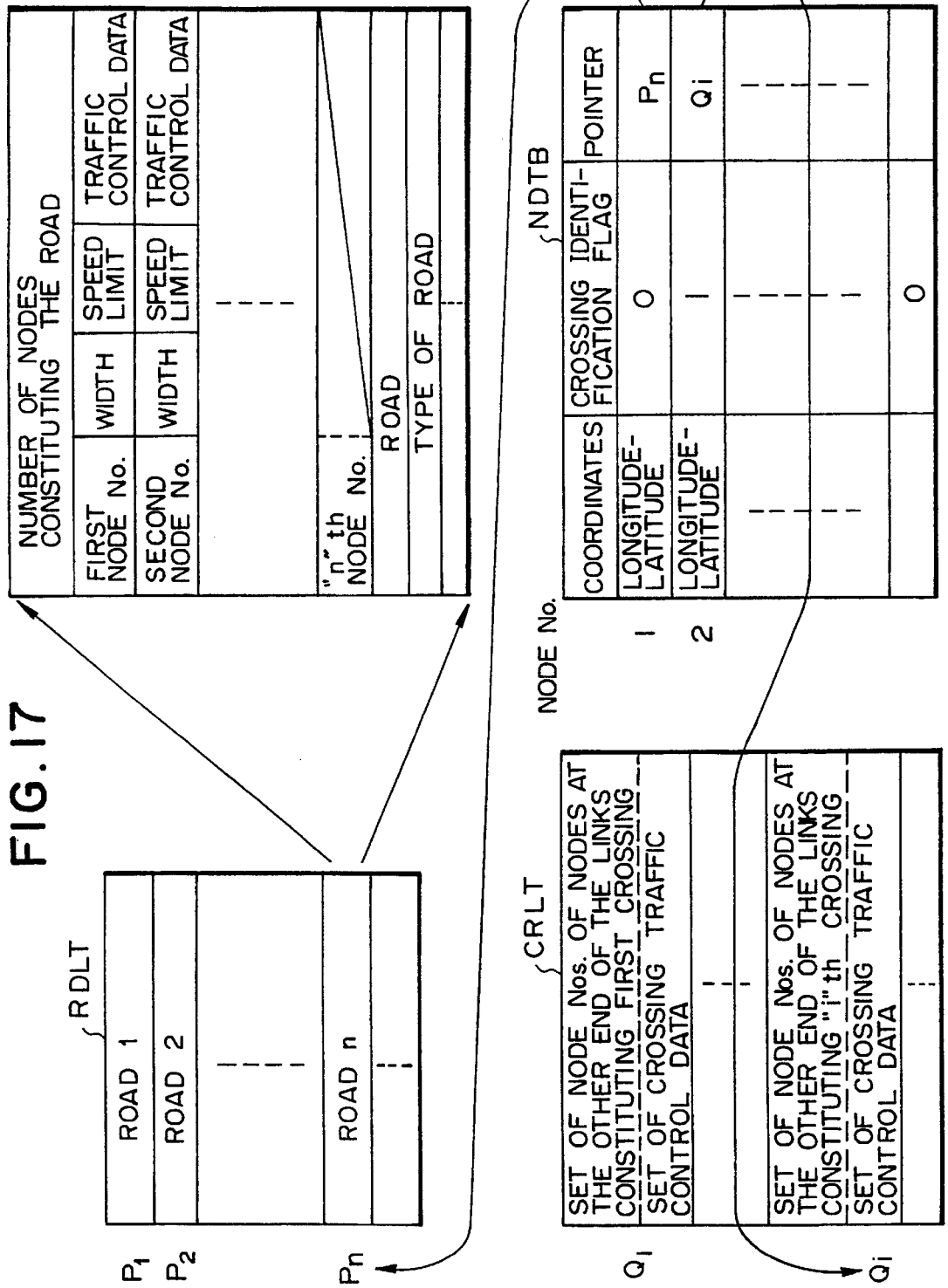
FIG. 17 illustrates road data structures in the map data.
Figure 18:
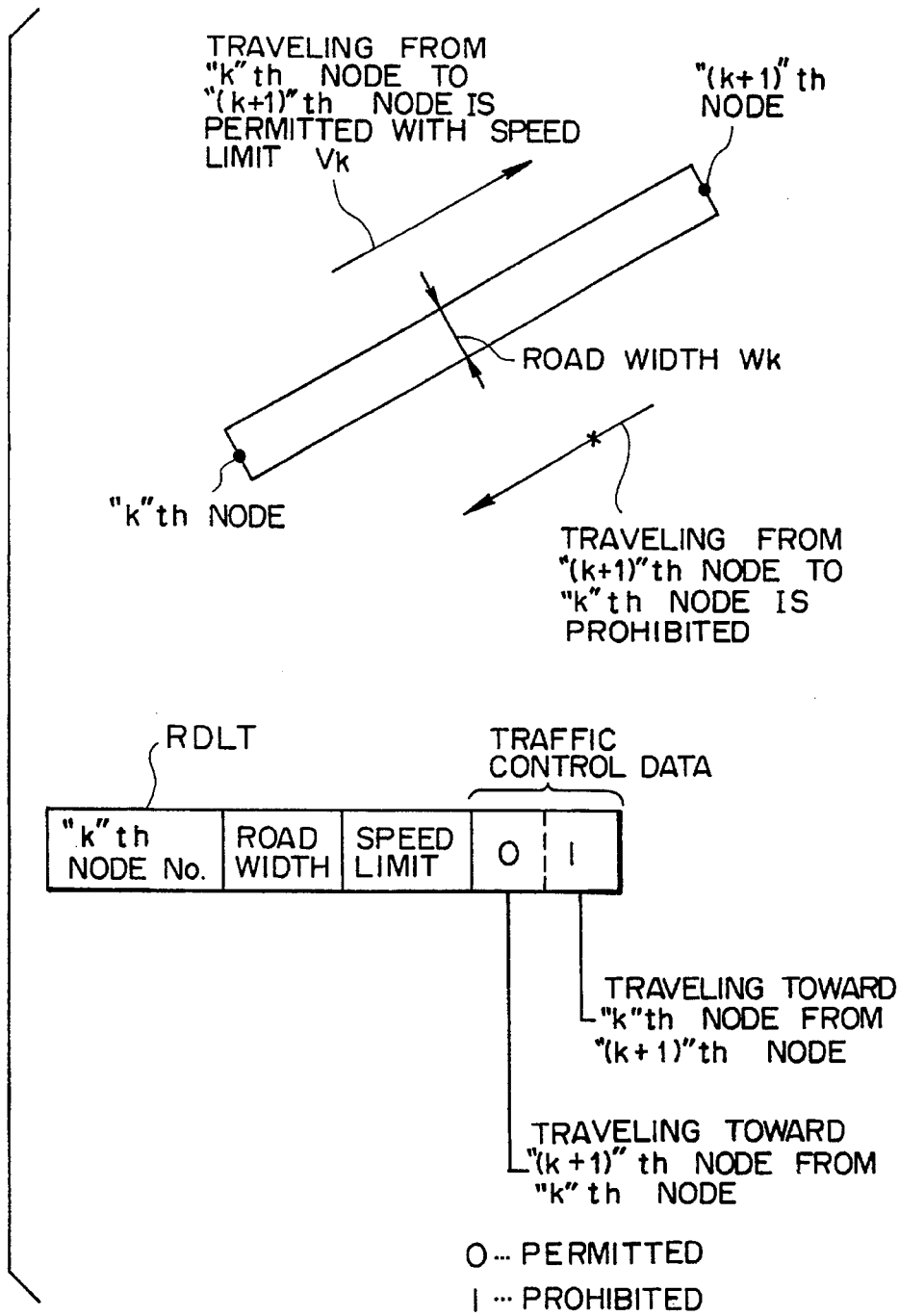
FIG. 18 illustrates traffic control data.
Figure 20:
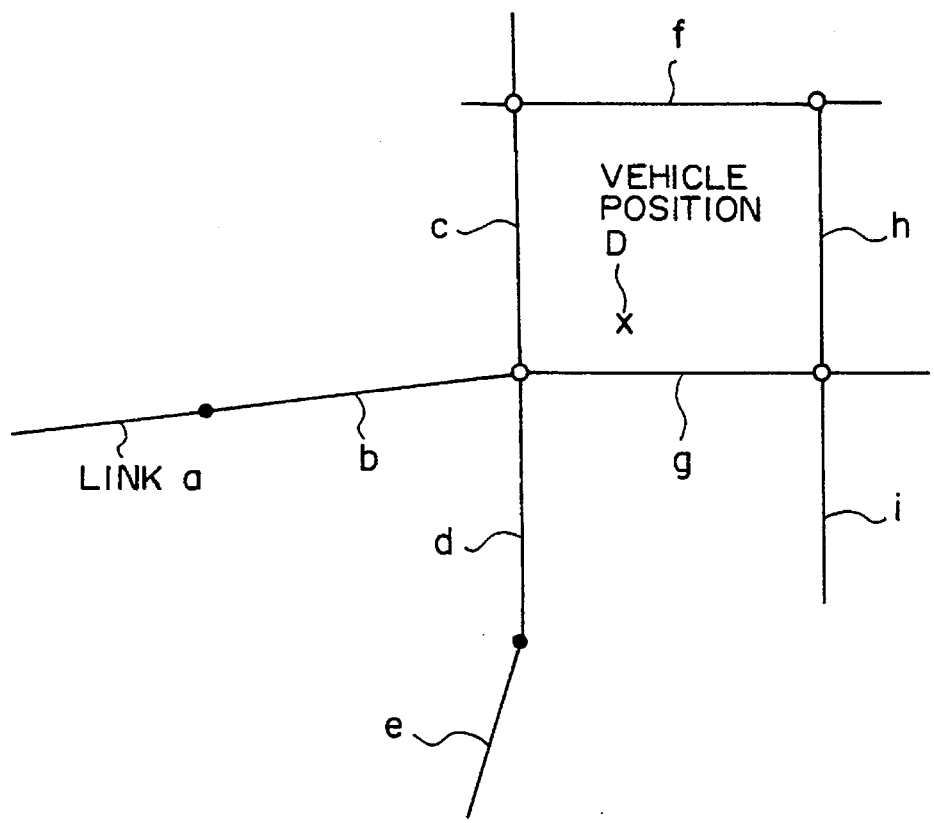
FIG. 20 illustrates the conventional existing link detection method.

A navigation controller 10 uses road data from the map data stored in the CD-ROM 1 to determine by a simulation calculation a shortest and optimal guide route connecting the start point and the destination, or to cause a map image in the vicinity of the vehicle to be displayed on the CRT display device 5 together with, as required, the cursor mark, vehicle position mark, highlighted guide route, etc. A buffer memory 11 temporarily stores map data read from the CD-ROM 1. An existing link detecting section 12 receives vehicle position data, vehicle azimuth data and vehicle velocity data from the GPS receiver 4 and, by looking up the road data (see FIG. 17) in the map data, detects the link on which the vehicle currently is located, i.e., the "existing link" on the road along which the vehicle is currently traveling. In this embodiment, a link is defined as a segment connecting two nodes that are adjacent to each other on a particular road and is determined by the longitude-latitude coordinates of the two nodes. An evaluation function table memory 13 stores an evaluation function table for detecting the existing link.

A cursor position calculating section 14 calculates longitude and latitude corresponding to the center of the map displayed on the screen and outputs them as the cursor position when a cursor operation has been performed through the cursor key on the operator panel 2. A map image depicting section 15 normally reads the map data in the vicinity of the vehicle position from the CD-ROM 1 out to the buffer memory 11 based on vehicle position data detected at the GPS receiver 4. Section 15 also stores in a video RAM (to be described later) a map image corresponding to nine screen frames obtained by combining a center map including the vehicle position and eight other maps surrounding that map, with the north direction of the maps conventionally being directed upward. Further, when the cursor key is operated at the operator panel 2, the map image depicting section 15 rewrites the map image in the video RAM in accordance with the change in the cursor position input from the cursor position calculating section 14 such that the cursor position is always at the center thereof while, as required, reading out new map data from the CD-ROM 1 to the buffer memory 11.

A guide route depicting section 16, when in a route guiding mode, selects guide route data that falls within the range of the map image which is currently depicted in the video RAM, from guide route data stored in a guide route memory (to be described later). The guide route highlighted in a different color from the other roads is depicted superimposed on the map image.

A start/destination setting section 17 sets the output of the cursor position calculating section 14 at that point in time as the start point data, upon pressing of the start point setting key after the route guiding mode is attained by the operator panel 2 and also after the cursor at the center of the screen is caused to coincide with the start point by operation of the operator panel 2. Upon pressing of the destination setting key after the cursor at the center of the screen is caused to coincide with the destination through an operation of the operator panel 2, section 17 sets the output of the cursor position calculating section 14 at that point in time as the destination data.

A route search section 18 receives start point data and destination data from the start/destination setting section 17 when setting operations of the start point and the destination are performed under the route guiding mode. Section 18 reads a number of map data, including a square region of which a diagonal is defined by the line connecting the start point and the destination, out of the CD-ROM 1 to the buffer memory 11. Section 18 also looks up the road data in the read out map data to perform a simulation calculation based on the above-mentioned Dijkstra method or breadth first search. An optimal guide route for the destination from the start point is obtained by using the shortest traveling distance as the parameter. A string of node sequence (longitude-latitude coordinates of the respective nodes) forming the guide route is stored together with the start point data and the destination data as the guide route data into the guide route memory to be described later. The respective nodes of the node sequence are extracted from the node table (see NDTB in FIG. 17) of the map data and include crossing nodes and simple nodes.

Figures 2, 3:
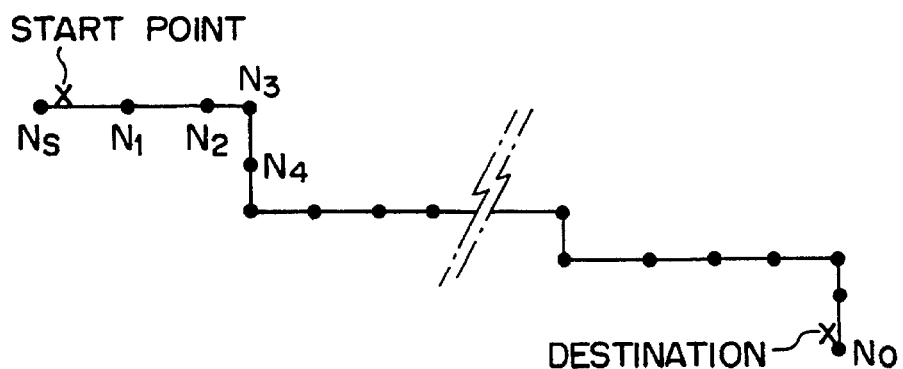
FIG. 2 illustrates a data structure to be stored in a guide route memory.
FIG. 3 illustrates start point data and destination data to be stored in the guide route memory.

A guide route memory 19 stores the guide route data. If, for example, the node sequence obtained at the route search section 18 (except the start point data and the destination data) consists of $16^3-2$ nodes, the node sequence is sequentially stored as shown in FIG. 2 such that the start point data is stored to address F000H and those stored to addresses F001H— FFFEH are the node located most closely to the start point on the guide route to address F001H and the node located secondly closely to the start point on the guide route to F002H, and so forth. Then, the destination data is stored at the last address FFFFH.

It is assumed in this embodiment that, as shown in FIG. 3, the start point data and the destination data to be stored in the guide route memory 19 are set as nodes $N_S$ and $N_O$ (longitude-latitude coordinates) that are located most closely to the actual start point S and destination 0 (which usually do not coincide with nodes in the map data) set by the start/destination setting section 16.

Discriminating section 20 receives existing link information (longitude-latitude coordinates of two nodes) from the existing link detection section 12 and compares it with the node sequence stored in the guide route memory 19. By seeing if identical nodes exist for both of the two nodes forming the existing link, it determines whether the vehicle has deviated from the guided route or not. A warning statement generation section 21 generates a warning character sequence pattern stating "VEHICLE IS OFF THE GUIDED ROUTE", when the vehicle is determined to have deviated from the guided route by the discriminating section 20.

A video RAM 22 has a storage area of a size corresponding to nine screen frames and stores a map image depicted at the map image depicting section 15 (including a highlighted guide route of a different color from the other roads during travel under the route guiding mode). A read out control section 23 reads out data corresponding to one frame about the cursor position or the vehicle position of the image depicted in the video RAM 22 upon receiving read out control of the map image depicting section 15. A mark generation section 24 generates a cursor mark or generates a vehicle position mark directed in the vehicle azimuth. A synthesizing section 25 synthesizes a cursor mark or a vehicle position mark at the center of the image read out by the read out control section 23 and, when a warning character sequence pattern is generated by the warning statement generation section 21, also synthesizes it on the upper left of the image. A picture conversion section 26 converts the image data output from the synthesizing section 25 into a predetermined picture signal and outputs it to the CRT display device 5.

Figure 6:
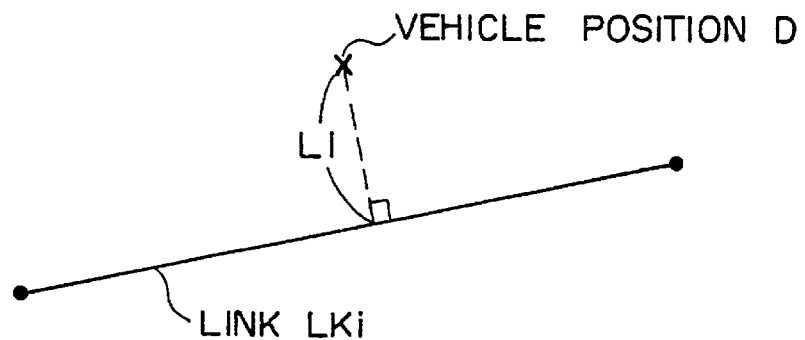
FIGS. 6(1), 6(2), 6(3) illustrate the existing link detection method.
Figure 6:
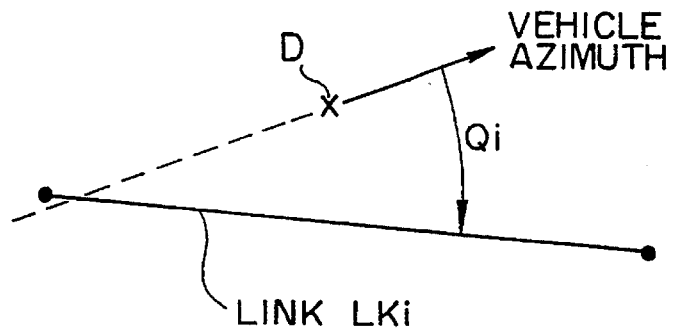
Figure 6:
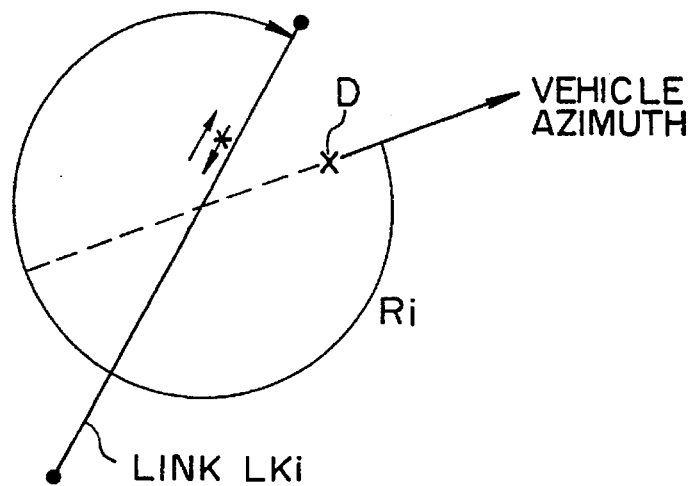
Figure 7:
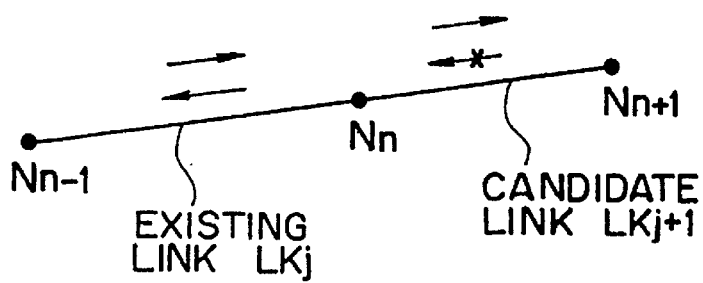
FIGS. 7(1) to 7(5) illustrate the existing link detection method.
Figure 7:
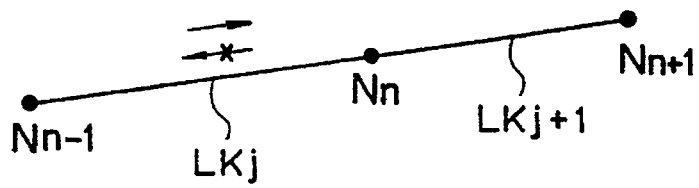
Figure 7:
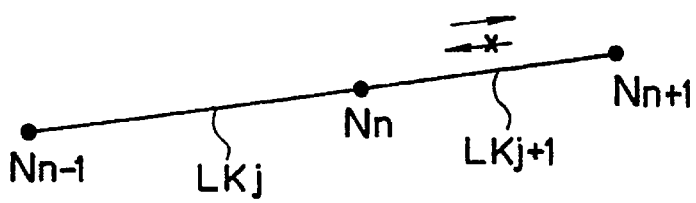
Figure 7:
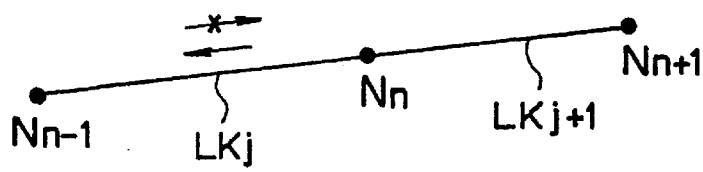
Figure 7:
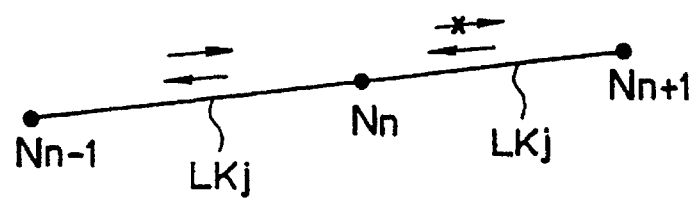

FIGS. 4(1) to 4(5) illustrate an evaluation function table stored in the evaluation function table memory, and FIGS. 5 to 7 illustrate the existing link detecting method performed by the existing link detecting section 12. It should be noted that the following description is for the case where the vehicle position is located at $D_o$ in FIG. 5.

In detecting the existing link of the vehicle, the existing link detecting section 12 first uses the road data (see FIG. 17) in the map data to extract all the candidate links located within a predetermined distance $r_c$ from the current vehicle position $D_o$. It should be noted that the links are each defined as a segment connecting two nodes that are next to each other on the same road and those links of which a part or the whole falls within the range of the predetermined distance $r_c$ from the vehicle position $D_o$ are extracted as the candidate links. If the relative position of the vehicle position and the candidate links is as shown in FIG. 5, the candidate links to be extracted will be $LK_1$ to $LK_5$.

Next, for each of the extracted candidate links $LK_1$ and $LK_5$, distance $L_1 \sim L_5$ ($L_1$ to $L_5$) from the vehicle position $D_o$ to the link, angle $Q_1 \sim Q_5$ formed between the vehicle azimuth and the link direction, speed difference $V_1 \sim V_5$ between the vehicle velocity and the speed limit, angle $R_1 \sim R_5$ formed between the vehicle azimuth and the direction along which traveling is possible and connectability $S_1 \sim S_5$ between the last-detected existing link and the candidate link, are obtained.

Here, as shown in FIG. 6(1), distance $L_i$ from the vehicle position $D_o$ to the link $LK_i$ (i=1~5) is calculated as the length of a perpendicular drawn from the vehicle position to the link $LK_i$. Further, as shown in FIG. 6(2), angle $Q_i$ between the vehicle azimuth and the direction of the link is obtained by measuring the direction of the link clockwise with respect to the vehicle azimuth. The speed difference $V_i$ between the vehicle velocity and the speed limit of the link is obtained by subtracting the limit speed from the vehicle velocity. As shown in FIG. 6(3), angle $R_i$ between the vehicle azimuth and the passable direction of the link is obtained by measuring the passable direction of the link (the direction along which traveling is permitted by the traffic control data in the road list) clockwise with respect to the vehicle azimuth. It should be noted that, if no traffic control data exists for that candidate link, it is assumed that traveling in both directions is possible and the direction of the link is measured clockwise with respect to the vehicle azimuth to obtain Ri.

Finally, in finding connectability Si between the last-detected existing link and the candidate link, it is assumed that the last-detected is $LK_1$ in FIG. 5. Since the candidate link $LK_1$ is the same as the existing link $LK_1$, its connectability is "1". Since the candidate link $LK_2$ is directly connected to the last-detected existing link $LK_1$ and also since traveling from the link $LK_1$ to the link $LK_2$ is permitted by the crossing traffic control data and the traffic control data, its connectability is "1". Since the link $LK_3$ is also directly connected to the link $LK_1$ and, though traveling from the link $LK_1$ to the link $LK_3$ is permitted by the crossing traffic control data, no traffic control data of the link $LK_3$ exists, its connectability is "2". Since, though the link $LK_4$ is directly connected to the link $LK_1$, traffic is prohibited by the crossing traffic control data with respect to traveling from the link $LK_1$ to the link $LK_4$, its connectability is "3". Since the link $LK_5$ is not directly connected to the link $LK_1$, its connectability is "4".

In regard of traveling with respect to the crossing $N_1$ in FIG. 5 along nodes $N_S \rightarrow N_1 \rightarrow N_{11}$, in the case where no crossing traffic control data exists, the connectability between the existing link $LK_1$ and the candidate link $LK_3$ is "2", if no traffic control data related to the link $LK_3$ exists or if, though it exists, traveling in the direction of nodes $N_1 \rightarrow N_{11}$ is permitted.

Further, in the case of a candidate link $LK_{j+1}$ which shares a simple node $N_n$ with the existing link $LK_j$ as shown in FIG. 7; the connectability of the candidate link $LK_{j+1}$ to the existing link $LK_j$ is "1" if traffic control data exists for the both and traveling through nodes $N_{n-1} \rightarrow N_n$ is permitted and traveling through $N_n \rightarrow N_{n+1}$ is also permitted (see FIG. 7(1)); the connectability of the candidate link $LK_{j+1}$ to the existing link $LK_j$ is "2" if traffic control data exists for the link $LK_j$ and traveling through nodes $N_{n-1} \rightarrow N_1$ is permitted but no traffic control data exists for the link $LK_{j+1}$ (see FIG. 7(2)); the connectability of the candidate link $LK_{j+1}$ to the existing link $LK_j$ is likewise "2" if traffic control data exists for the link $LK_{j+1}$ and traveling through nodes $N_n \rightarrow N_{n+1}$ is permitted but no traffic control data exists for the link $LK_j$ (see FIG. 7(3)); the connectability of the candidate link $LK_{j+1}$ to the existing link $LK_j$ is "3" if traffic control data exists for the link $LK_j$ and traveling through nodes $N_{n-1} \rightarrow N_n$ is prohibited (see FIG. 7 (4)); the connectability of the candidate link $LK_{j+1}$ to the existing link $LK_j$ is likewise "3" if traffic control data exists for the link $LK_{j+1}$ and traveling through nodes $N_n \rightarrow N_{n+1}$ is prohibited (see FIG. 7(5)).

Next, for each of the candidate link $LK_i$, the existential probability Pi is calculated by the following existential probability evaluation function:

$P_i = f_L(L_i) + f_Q(Q_i) + f_v(V_i) + f_R(R_i) + f_s(S)$ where i=1~5 for $D_o$ in FIG. 5.

In equation (1) : $f_L(L_i)$ is an evaluation function concerning the distance Di between the vehicle position Do and the candidate link i; $f_Q(Q_i)$ is an evaluation function concerning angle Qi between the vehicle azimuth and the candidate link i; $f_v(V_i)$ is an evaluation function concerning the speed difference $V_i$ between the vehicle velocity and the speed limit in the candidate link i; $f_R(R_i)$ is an evaluation function concerning angle $R_i$ between the vehicle azimuth and the passable direction of the candidate link i; and $f_s(S_i)$ is an evaluation function concerning connectability $S_i$ between the last-detected existing link and the candidate link i. Each of these is defined by a table in FIGS. 4(1) to 4(5).

As is seen from FIGS. 4(1) to 4(5):

$0 \leq f_L(L_i) \leq 0.2$ $0 \leq f_Q(Q_i) \leq 0.2$ $0 \leq f_v(V_i) \leq 0.1$ $0 \leq f_R(R_i) \leq 0.3$ $0 \leq f_s(S_i) \leq 0.2$ and $0 \leq P_i \leq 1$.

The existing link detecting section 12 determines one with the largest existential probability among $P_1 \sim P_5$ of the candidate links $LK_1 \sim LK_5$ as the existing link for the vehicle position $D_o$ at this time. It outputs longitude-latitude coordinates of the two nodes at both ends to the discriminating section 20 as the existing link information.

Figure 13:
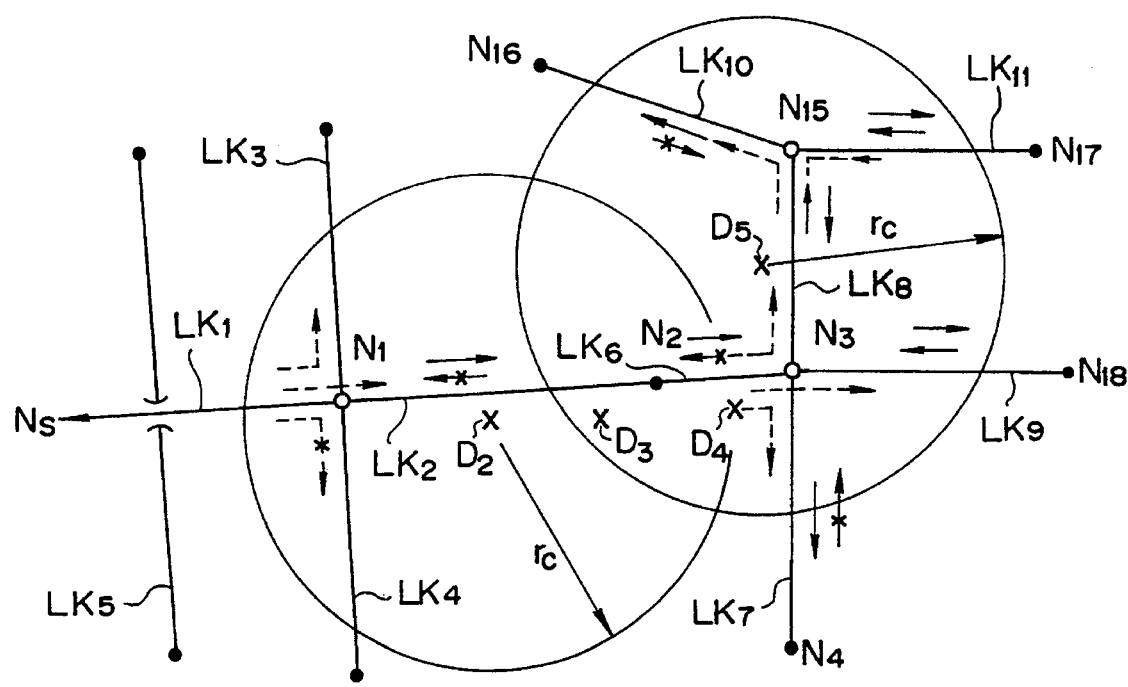
FIG. 13 illustrates an arrangement of the roads in the vicinity of the start point.
Figure 14:
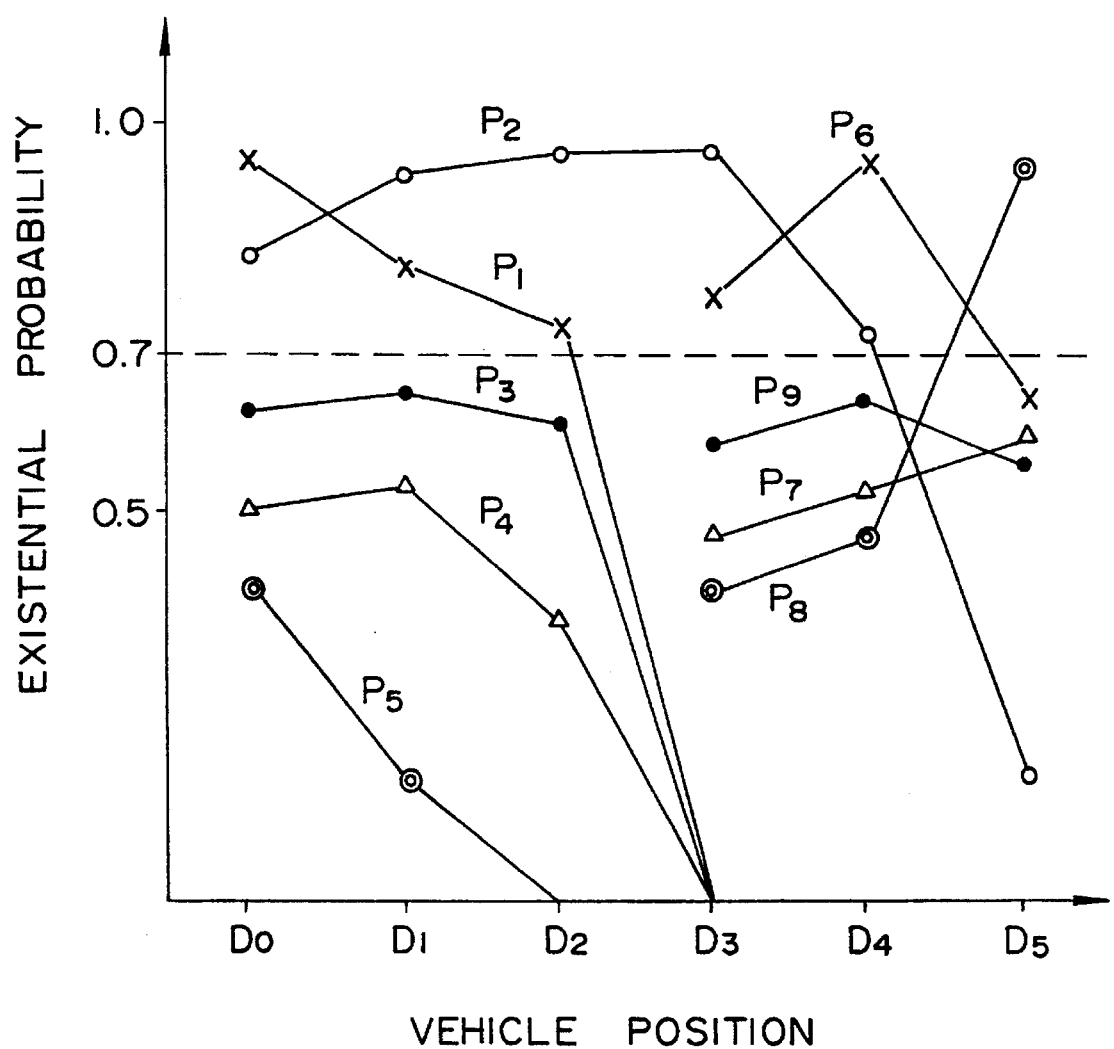
FIG. 14 is a chart showing the relation between the vehicle position and the respective existential probability of candidate links.
Figure 15:
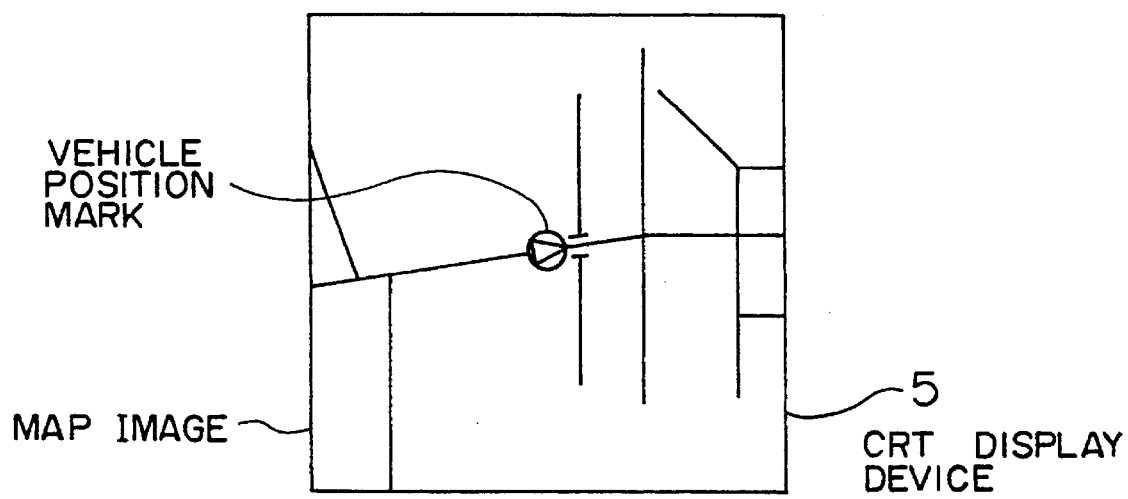
FIGS. 15(1), 15(2) illustrate an example of a display on the screen.
Figure 15:
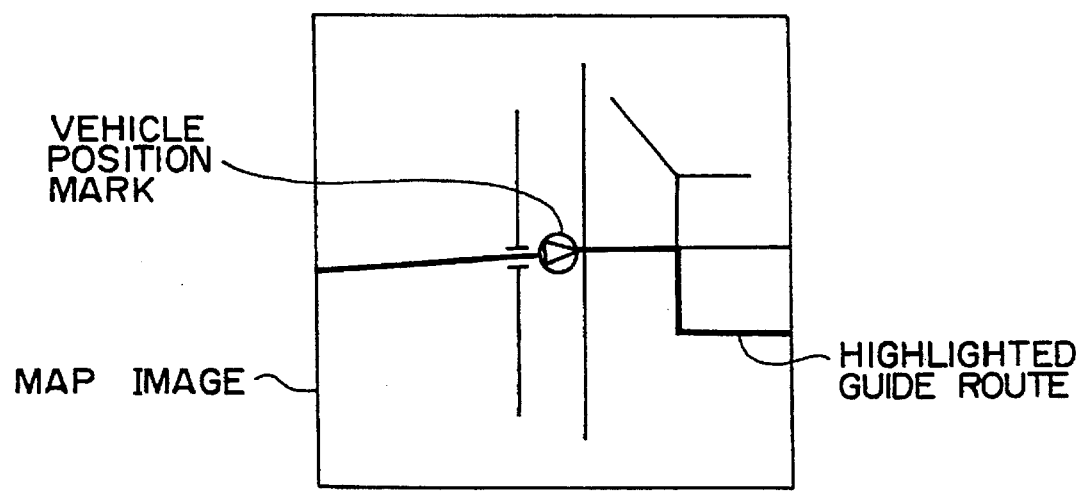
Figure 16:
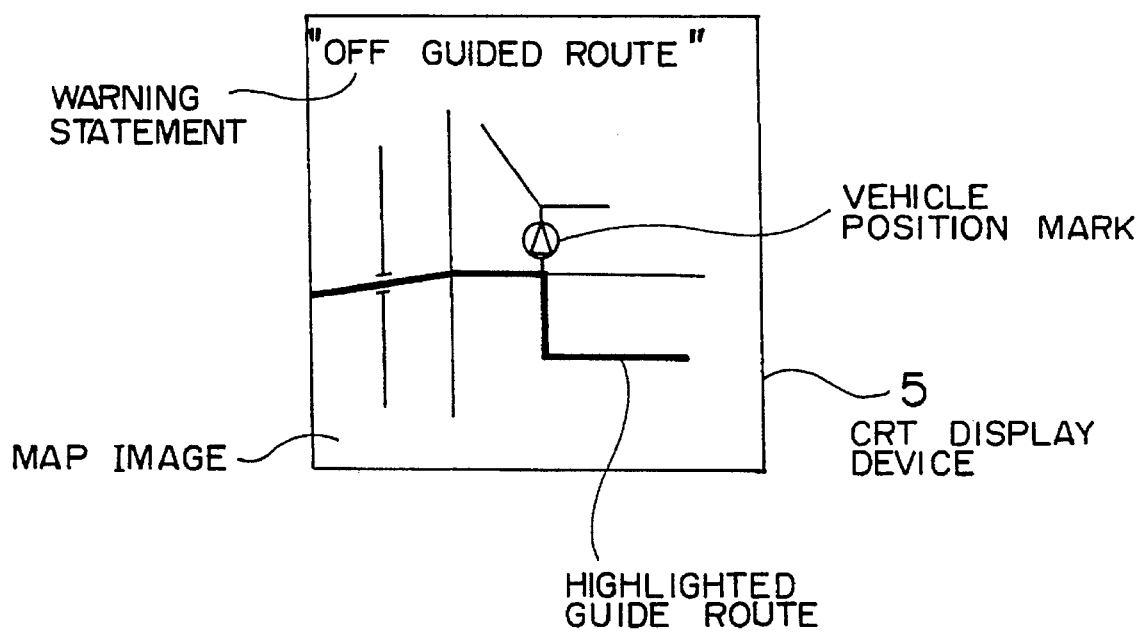
FIG. 16 illustrates an example of a display on the screen.

FIGS. 8 to 12 are a flow diagram showing operation of a computer program of the navigation controller 10; FIG. 13 illustrates the road arrangement in the vicinity of the start point; FIG. 14 is a chart showing the relation between the vehicle position and the existential probabilities of the respective candidate links; and FIGS. 15 and 16 illustrate the display screen of the CRT display device 5. A description follows in accordance with these figures.

It is assumed that the route guiding mode at first is off.

When power is turned on, the GPS receiver 4 periodically determines vehicle positions vehicle azimuth and vehicle velocity by means of satellite navigation using as described above GPS radio signals received from GPS satellites and outputs these data as determined by GPS receiver 4 to the navigation controller 10.

Figure 8:
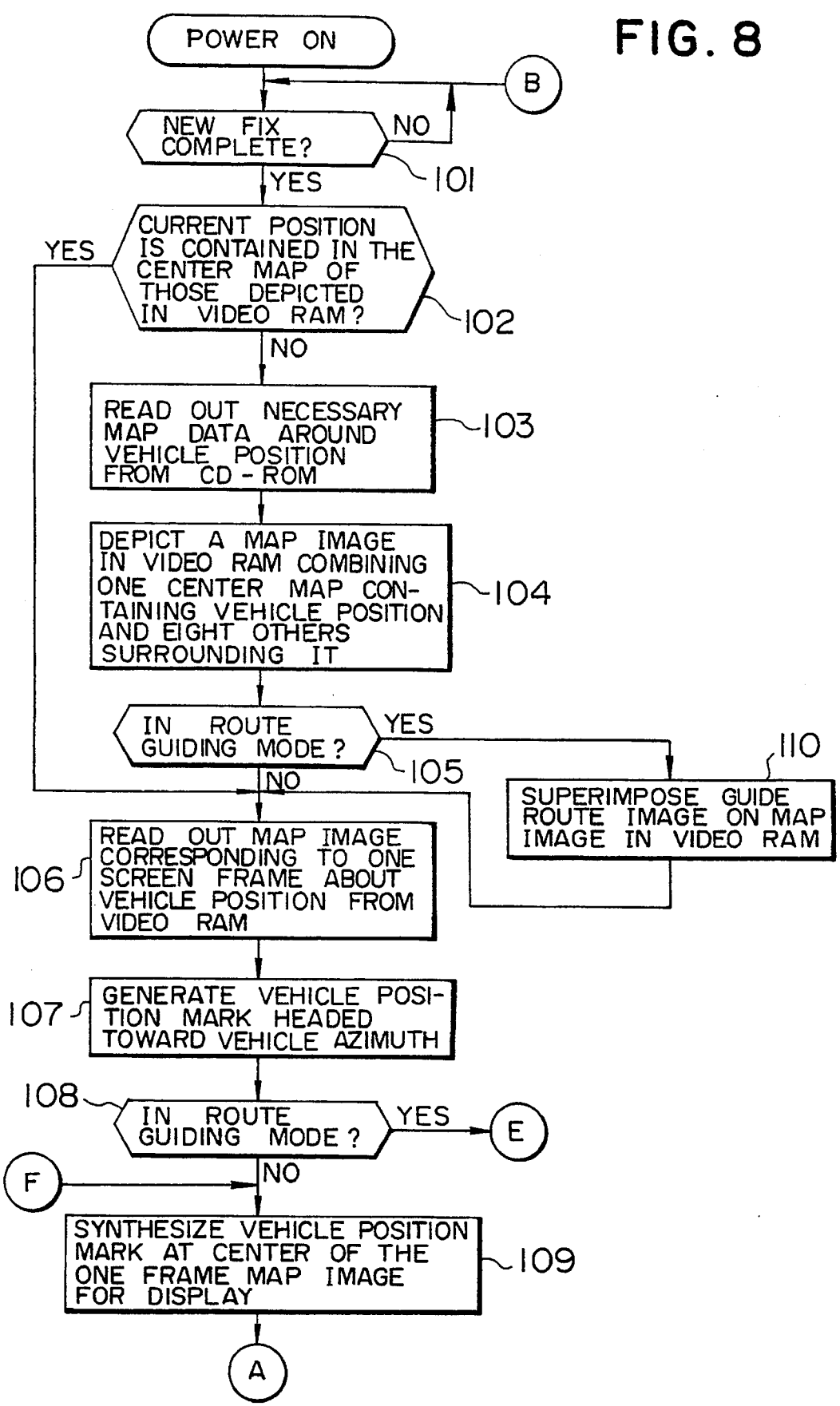
FIG. 8 is a first flow diagram showing operation of the navigation controller.

The navigation controller 10, after its power is turned on, waits until a first fix (vehicle position determination) is obtained by means of the GPS receiver 4 (Step 101 in FIG. 8). After completion of the fix, the map image depicting section 15 reads the map data in the vicinity of the vehicle position out from the CD-ROM 1 and stores it in the buffer memory 11; it also uses the read out map data to depict in the video RAM 22 an map image corresponding to nine screen frames obtained by incorporating a center map containing the vehicle position and eight other maps surrounding that map with the north direction of the maps being directed upward (Steps 102 to 104).

Next, the navigation controller 10 checks if it is currently in the route guiding mode (Step 105). Here, since "NO" is obtained, the map image depicting section 15 performs read out control by providing to the read out control section 23 a read out center position data which corresponds to the vehicle position in the video RAM 22. An image corresponding to one screen frame of which the center is the vehicle position is caused to be read out from the video RAM 22 (Step 106). On the other hand, the mark generation section 24 receives the vehicle azimuth data from the GPS receiver 4 to generate a vehicle position mark in the direction of the vehicle azimuth (Step 107). The vehicle position mark is synthesized at the center of the map image corresponding to one screen frame by the synthesizing section 25; and it is furthermore converted into a predetermined picture signal at a picture conversion section 26 to be output to the CRT display device 5 so as to be displayed on the screen (Steps 108, 109).

As a result, the vehicle position mark together with a map image in the vicinity of the vehicle position is displayed on the screen so that the current position and the traveling direction on the map are indicated (see FIG. 15(1)).

Figure 9:
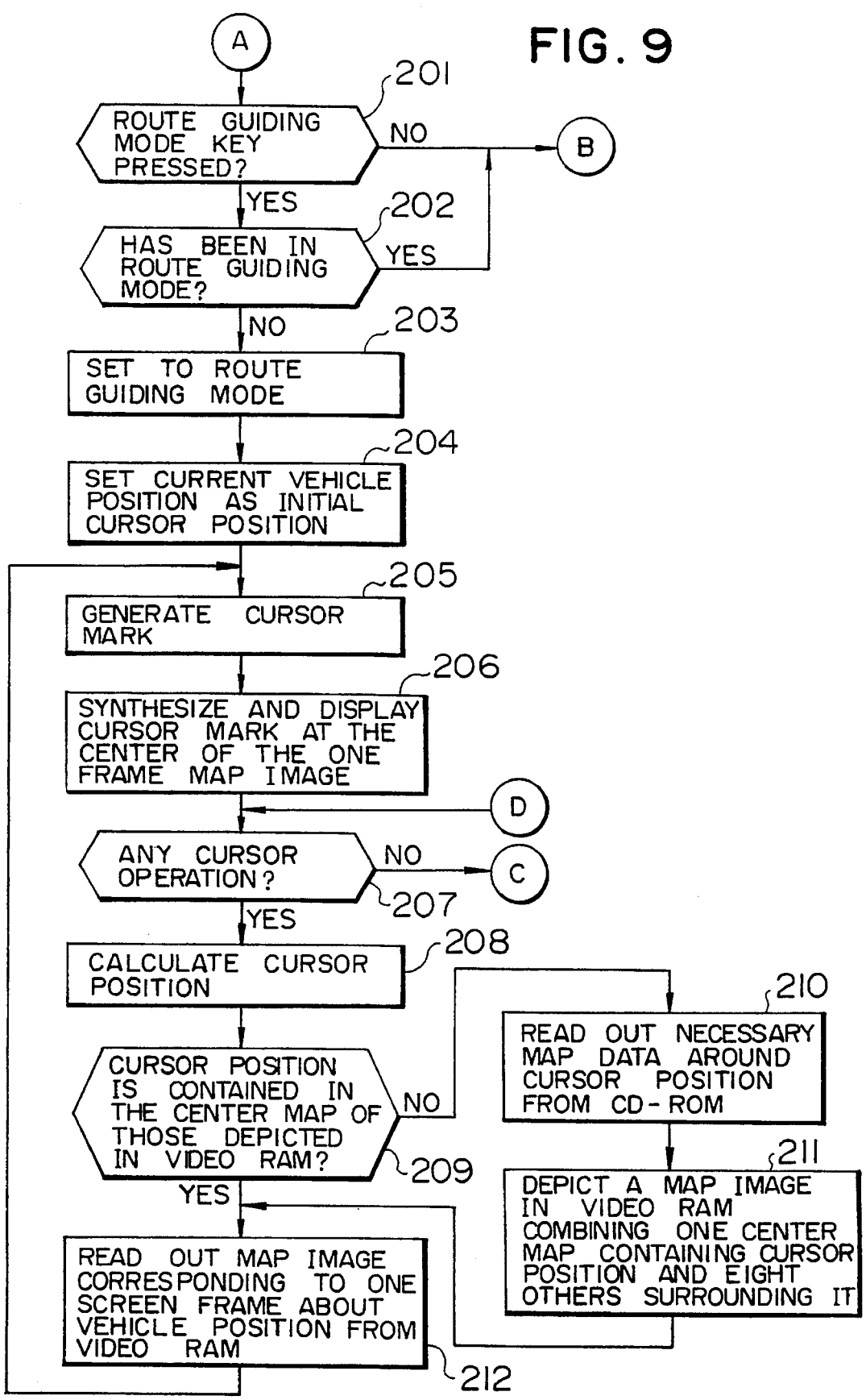
FIG. 9 is a second flow diagram showing operation of the navigation controller.

Here, if the driver wishes to travel under route guiding to a desired destination by setting the current position as the start point, he first presses the route guide key on the operator panel 2 to set the route guiding mode (Steps 201 to 203 in FIG. 9). At this time, the cursor position calculating section 14 initializes the current position as the cursor position (longitude-latitude coordinates) (Step 204). Further, the mark generation section 25 generates a cursor mark in the place of the vehicle position mark and causes the cursor mark to be displayed at the center of the screen (Steps 205, 206).

Figure 10:
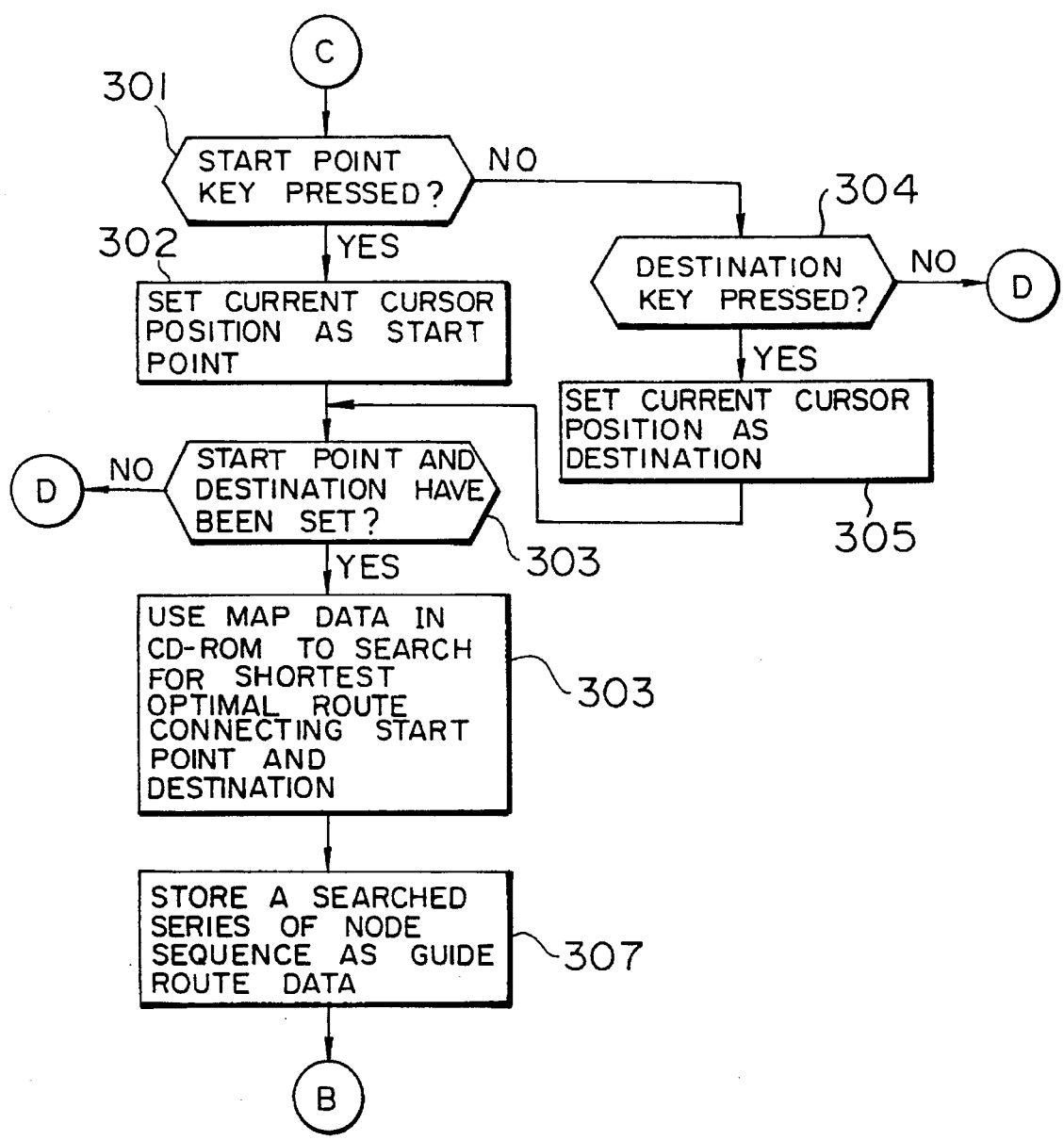
FIG. 10 is a third flow diagram showing operation of the navigation controller.

By pressing the start point setting key on the operator panel 2 in this state, the start/destination setting section 17 sets the current cursor position as the start point (Steps 301, 302 in FIG. 10).

Subsequently, upon pressing of the cursor key on the operator panel 2 to perform a cursor operation, the cursor position calculating section 14 calculates again the cursor position in accordance with such operation (Steps 207, 208 in FIG. 9). When the cursor position is changed, the map image depicting section 15 checks if the cursor position is contained in the center one of the maps which are currently depicted in the video RAM 22 (Step 209). If contained, processing proceeds to Step 212. If not contained, it reads a necessary map data in the vicinity of the cursor position from the CD-ROM 1 and stores it to the buffer memory 11; and it uses the read out map data to depict in the video RAM 22 a map image corresponding to nine screen frames obtained by incorporating a center map containing the cursor position and eight other maps surrounding that map, with the north direction thereof being directed upward (Steps 210, 211). Processing then proceeds to Step 212.

In Step 212, the map image depicting section 15 performs read out control by providing to the read out control section 23 a read out center position data corresponding to the cursor position in the video RAM 22, to read from the video RAM 22 an image corresponding to one screen frame at the center of which the cursor position is located (Step 212). On the other hand, the mark generation section 24 continuously generates the cursor mark (Step 205). The cursor mark is synthesized at the center of the map image corresponding to one screen frame by the synthesizing section 25; and it is furthermore converted into a predetermined picture signal at the picture conversion section 26 to be output to the CRT display device 5 so as to be displayed on the CRT screen (Step 206). As a result, the map on the screen is scrolled in accordance with the cursor operation.

Upon pressing the destination setting key on the operator panel 2 when the cursor on the screen has coincided with a desired place, the start/destination setting section 17 sets the current cursor position as the destination (Steps 304, 305 in FIG. 10).

When setting of the start point and the destination is completed in this manner (i.e., YES at Step 303 in FIG. 10), the route search section 18 receives the start point data and the destination data from the start/destination setting section 17. It reads out from the CD-ROM 1 to the buffer memory 11 map data containing a square region of which a diagonal is a straight line connecting the start point and the destination. At the same time, section 18 uses the road data (see FIG. 17) in the map data to search for an optimal guide route by means of the Dijkstra method or a breadth first search using least distance as the parameter. It causes a series of node sequence (here including crossing nodes and simple nodes) constituting the guided route together with the start point data at the top (node $N_s$ in this case, see FIG. 3) and the destination data at the bottom (node $N_o$ in this case, see FIG. 3) to be stored into the guide route memory 19 (Steps 306, 307). If the guided route is composed of $16^3-2$ nodes (excluding the start point data and the destination data), the content of the guide route memory 19 is as shown in FIG. 2.

Upon completion of search for the guide route, the navigation controller 10 returns to Step 101 in FIG. 8. The map depiction control section 15 reads the map data in the vicinity of the current position out from the CD-ROM 1 to the buffer memory 11 on the basis of the vehicle position data input from the GPS receiver 4. It uses the read out map data to depict in the video RAM 22 a map image corresponding to nine screen frames obtained by combining a center map containing the current position and eight other maps surrounding that map, with the north direction of the maps being directed upward (Steps 102~104).

Next, since the system is currently in the route guiding mode (YES at Step 105), the guide route depicting section 16 selects node data contained in the map area currently depicted in the video RAM 22 from the guide route memory 19 and depicts a guide route which is highlighted as made wider in a specific color in a superimposed manner (Step 110).

Then, the map image depicting section 15 provides to the read out control section 23 the read out center position data corresponding to the current position in the video RAM 22 to perform read out control and causes it to read out from the video RAM 22 an image corresponding to one screen frame the center of which is the current position (Step 106). On the other hand, the mark generation section 24 generates a vehicle position mark in the direction of the vehicle azimuth on the basis of the vehicle azimuth data input from the GPS receiver 4 (Step 107).

Thereafter, the navigation controller 10 checks if it is currently in the route guiding mode (Step 108). Since YES is obtained here, the existing link detecting section 12 takes in the vehicle position data, vehicle azimuth data and vehicle velocity data from the GPS receiver 4 and uses the road data (see FIG. 17) in the map data stored in the buffer memory 11 to perform detection of the existing link (Step 401 in FIG. 11). Next, the discriminating section 20 collates the detected existing link information (longitude-latitude coordinates of the two nodes at both ends of the link) and the guide route data stored in the guide route memory 19, so as to determine whether the vehicle has deviated from the guide route or not (Step 402). Specifically, the vehicle is determined as traveling on the guided route if both of the nodes at the two ends of the existing link are included in the nodes which constitute the guide route data. The vehicle is determined as having deviated from the guided route if one or both of the nodes at the two ends of the existing link is not included in the nodes which constitute the guide route.

Here, assuming that the vehicle is determined as being on the guide route by the discriminating section 20, the warning character generation section 21 does not generate a warning character sequence pattern ($N_o$ at Step 403). The synthesizing section 25 synthesizes only the vehicle position mark generated by the mark generation section 24 at the center of the map image corresponding to one screen frame read out from the video RAM 22 by the read out control section 23. The synthesized image is converted into a predetermined picture signal at the picture conversion section 26 and is then output to the CRT display device 5 to be displayed on the screen (Step 109 in FIG. 8).

Since, as a result, the highlighted guide route and the vehicle position mark are displayed on the screen superimposed on the map image in the vicinity of the vehicle position, it is easy for the driver to see which one of the roads should be taken in which direction in order to arrive at the desired destination (see FIG. 15(2)).

Thereafter, the navigation controller 10 checks whether the route guide key has been pressed at the operator panel 2 (Step 301 in FIG. 10). If NO, it returns to Step 101 in FIG. 8 and waits for completion of the next fix at the GPS receiver 4. Upon the completion of the fix, the map image depicting section 15 receives new vehicle position data from the GPS receiver 4 and checks whether the current position is contained in the center one of the maps currently depicted in the video RAM 22 (Step 102). If YES, processing proceeds to Step 106 where the read out center position data corresponding to the new vehicle position in the video RAM 22 is provided to the read out control section 23 to effect read out control. An image corresponding to one screen frame, the center of which is the new vehicle position is read out from the video RAM 22. On the other hand, the mark generation section 24 generates a vehicle position mark along the direction of the vehicle azimuth, on the basis of a new vehicle azimuth data received from the GPS receiver 4 (Step 107).

Figure 11:
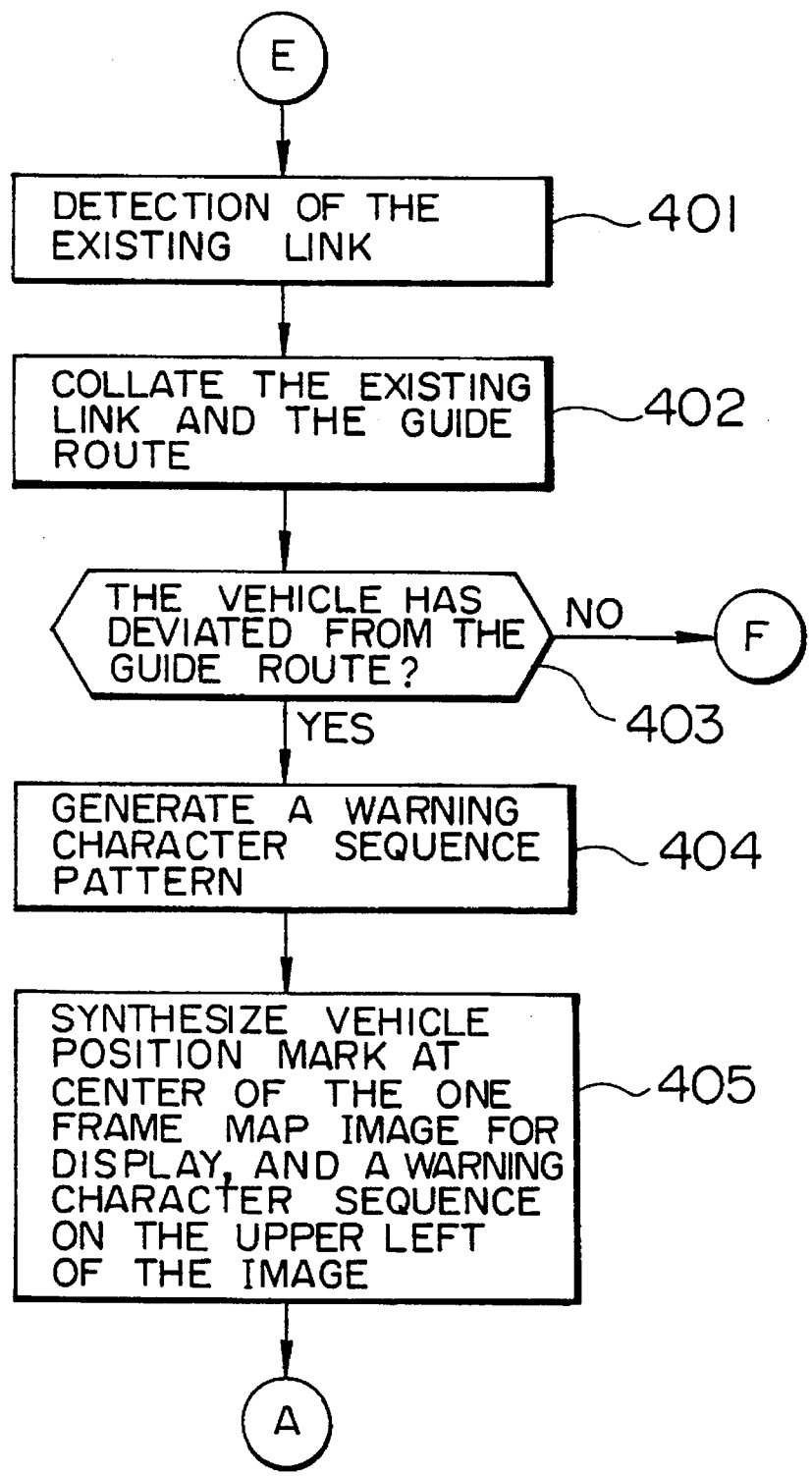
FIG. 11 is a fourth flow diagram showing operation of the navigation controller.

Thereafter, the existing link detection section 12 receives vehicle position data, vehicle azimuth data and vehicle velocity data from the GPS receiver 4 and uses the road data stored in the buffer memory 11 to perform detection of the existing link (Step 401 in FIG. 11). Next, the discriminating section 20 determines whether the vehicle has deviated from the guided route (Step 402). If it has not deviated, the warning statement generation section 21 does not generate a warning character sequence pattern (NO at Step 403). The synthesizing section 25 synthesizes only the vehicle position mark which has been generated by the mark generation section 24 at the center of the map image corresponding to one screen frame read out from the video RAM 22 by the read out control section 23. The synthesized image is converted into a predetermined picture signal at the picture conversion section 26 and is then output to the CRT display device 5 to be displayed on the screen (Step 109 in FIG. 8).

As a result, while the vehicle position is being fixed at the center on the screen, the map image is scrolled toward the direction opposite to the traveling direction of the vehicle together with the highlighted guide route and the vehicle position mark. It is possible for the driver at all times to view the map in the vicinity of the vehicle position and the highlighted guide route.

Thereafter, as far as the vehicle travels in a similar manner toward the destination without deviating from the guided route, the nearby map image about the current position is continually displayed on the screen, together with the highlighted guide route and the vehicle position mark.

A description follows in detail by way of FIGS. 12 to 14, FIG. 16 and FIG. 5 with respect to the existing link detection processing to be performed at Step 401 in FIG. 11.

It is assumed here that the vehicle position fixed by the GPS receiver 4 has changed through positions $D_o \rightarrow D_1 \rightarrow D_2 \rightarrow D_3 \rightarrow D_4 \rightarrow D_5 \ldots$ as the vehicle has traveled along the guided route.

The existing link detection processing to be performed when the vehicle position is at $D_o$ is described with reference to FIG. 5. All the links within distance $r_c$ from $D_o$ are first extracted by looking up the road data. For each of the links, longitude-latitude coordinates of the nodes at the both ends, speed limit and traffic control data are registered in an internal memory as the candidate link data (Step 4010 in FIG. 12). If a node of the candidate link is at a crossing, the crossing constituting node and the crossing traffic control data are also registered. Here, the links $LK_1 \sim LK_5$ are extracted.

Next, the existing link detection section 12 checks if it was possible to extract one or more candidate link at processing in Step 4010 (Step 4011). Since YES is obtained here, obtained next for the respective candidate links $LK_1 \sim LK_5$ are: distance $L_1 \sim L_5$ from $D_o$; angle $Q_1 \sim Q_5$ formed between the vehicle azimuth and the link at $D_o$; speed difference $V_1 \sim V_5$ between the vehicle velocity and the speed limit of the link at $D_o$; angle $R_1 \sim R_5$ formed between the vehicle azimuth and the passable direction at $D_o$; and connectability $S_1 \sim S_5$ with the last-detected existing link (Steps 4012–4016).

Then, for each link, the existential probability $P_1 \sim P_5$ is obtained by substituting into the existential probability evaluation function of equation (1) (Step 4017). At this time, the evaluation function table in FIG. 4 is looked up. It should be noted that, if no traffic control data exists for the link $LK_i$, the evaluation function $f_R(R_i)$ is determined as having a fixed value of 0.1. Further, since there is no last-detected existing link for the first detection, the connectability $S_1 \sim S_5$ are all determined as having a fixed value of 0.1.

Then, of the obtained existential probabilities $P_1 \sim P_5$ of the respective links $LK_1 \sim LK_5$, one with the largest value among those with a value of 0.7 or more is selected and determined to be the existing link. Entries updated as the existing link information currently in the internal memory are: longitude-latitude coordinates of the nodes at the both ends; traffic control data; and crossing constituting nodes and crossing traffic control data if a node at the two ends corresponds to a crossing. In addition, the longitude-latitude coordinates of the nodes at the both ends are output to the discriminating section 20 (Steps 4018, 4019).

If none of the existential probabilities $P_1 \sim P_5$ of the respective links $LK_1 \sim LK_5$ has a value of 0.7 or more, determination of the existing link for the vehicle position $D_o$ of this time is not performed (NO at Step 4018).

When the existential probabilities $P_1 \sim P_5$ of the respective candidate links $LK_1 \sim LK_5$ at $D_o$ are as shown in FIG. 14, the link $LK_1$ is determined as the existing link. Since both of the two end nodes $N_a$ and $N_1$ of the link $LK_1$ are contained in the guide route data, the discriminating section 20 at Step 403 in FIG. 11 determines as that the vehicle is on the guided route.

Thereafter, when the vehicle position $D_o$ detected by the GPS receiver 4 has changed from $D_O$ to $D_1$ (see FIG. 5), since the candidate links for $D_1$ are not changed from $LK_1 \sim LK_5$, the existing link detecting section 12 is able to calculate the existential probability by using as the candidate link information which has been registered in the internal memory at the time of the previous detection of the existing link for $D_0$. At this time, however, since there is the last-detected existing link $LK_1$, connectabilities $S_1 \sim S_5$ are determined as follows.

Specifically, since the candidate link $LK_1$ is the same as the last-detected existing link, connectability $S_1$="1". Further, connectability $S_2$="1", since the link $LK_2$ is directly connected to the last-detected existing link as the node $N_1$ at one end thereof is common with the node (crossing node) at one end the link $LK_1$ and also since traffic from the last-detected existing link $LK_1$ to the link $LK_2$ is permitted. Connectability $S_3$="2", although the link $LK_3$, also, is directly connected to the last-detected existing link as the node $N_1$ at one end thereof is common with the node (crossing) at one end of the link $LK_1$, since it is not clear if traveling through the link $LK_3$ from $N_1$ to $N_3$ is possible as there is no traffic control data for the link $LK_3$, though traffic from the link $LK_1$ to the $LK_3$ is permitted in the crossing traffic control data at the crossing node $N_1$.

Furthermore, connectability $S_4$=3, although the link $LK_4$ is directly connected as the node $N_1$ at one end thereof is common with the node (crossing) at one end of the link $LK_1$ since traffic from $LK_1$ to $LK_4$ is prohibited by the crossing traffic control data for the crossing.

Finally, since the link $LK_5$ and the existing link $LK_1$ are not directly connected to each other, connectability $S_5$=4.

When the existential probabilities of the respective candidate links at $D_1$ are as shown in FIG. 14, the existing link detecting section 12 determines the link $LK_2$ as being the existing link. Entries updated as the existing link information in the internal memory are: longitude-latitude coordinates of the nodes at the both ends; traffic control data; and crossing constituting nodes and crossing traffic control data if one or both nodes at the two ends corresponds to a crossing node. In addition, the longitude-latitude coordinates of the nodes at the both ends are output to the discriminating section 20.

Since both of the two end nodes $N_1$ and $N_2$ of the link $LK_2$ are contained in the guide route data, the discriminating section 20 determines at Step 403 in FIG. 11 that the vehicle is on the guided route.

Thereafter, when the vehicle position detected at the GPS receiver 4 has changed from $D_1$ to $D_2$ (see FIG. 13), the candidate links for $D_2$ are changed to $LK_1 \sim LK_4$, $LK_6$. Of the candidate link information registered in the internal memory, the existing link detecting section 12 deletes $LK_5$ but adds $LK_6$. The existential probabilities are then calculated in a similar manner as described for the respective candidate links. Of those with a value of 0.7 or more, the link with the largest value is determined as the existing link of this time. If the existential probabilities at $D_2$ of the respective links are as shown in FIG. 14, the link $LK_2$ is determined to be the existing link.

In this case, also, the discriminating section 20 determines that the vehicle is on the guided route.

Thereafter, if the candidate links and the existential probabilities are changed as shown in FIG. 14 as the vehicle travels along the guided route in a similar manner, the link $LK_2$ for $D_3$ and the link $LK_6$ for $D_4$ are respectively determined as the existing links. The discriminating section 20 continues to determine as that the vehicle is on the guided route.

It is then assumed that the vehicle position detected at the GPS receiver 4 becomes $D_5$ as a result that the vehicle has erroneously turned to the left at the crossing node $N_3$ to deviate from the guided route. It is assumed here that the candidate links are $LK_2$, $LK_6$, $LK_7 \sim LK_{11}$ and the existential probabilities for the respective links are as shown at $D_5$ in FIG. 14. The existing link detecting section 12 determines the link $LK_8$ as the existing link.

Then, since one node $N15$ of the link $LK_8$ is not contained in the guide route data, the discriminating section 20 determines at Step 403 in FIG. 11 that the vehicle has deviated from the guided route. In this case, the warning statement generation section 21 generates a character sequence pattern saying "the vehicle is off the guided route" and outputs it to the synthesizing section 25 (Step 404). The synthesizing section 25 synthesizes the vehicle position mark at the center of the map image and synthesizes the character sequence "the vehicle is off the guided route" at the upper left corner thereof (Step 405).

Since, thereby, the message "the vehicle is off the guided route" is displayed at the upper left on the screen, the driver is able to see that he has taken a wrong route. It is possible for the driver to immediately take measures to return to the guided route (see FIG. 16).

Display of the warning message continues as long as the vehicle is off the guided route, since the existing link detected at the existing link detecting section 12 does not coincide with a link on the guided route. Thereafter, the display of the warning message disappears when the vehicle returns to the guided route, since the existing link detected at the existing link detecting section 12 coincides with a link on the guided route (determined as NO at Step 403).

According to this embodiment, all the candidate links within a predetermined distance from the vehicle position are extracted. For each of the extracted candidate links, obtained are: the distance from the vehicle position to the candidate link; the angle formed between the vehicle azimuth and the candidate link; the angle between the vehicle azimuth and passable direction of the candidate link; the speed difference between the vehicle velocity and the speed limit of the candidate link; and the connectability between the last detected existing link and the candidate link. These are substituted into a predetermined existential probability evaluation function to calculate an existential probability. The link with the largest existential probability is determined as being the existing link. Therefore, detected as the existing link is the link which is most suitable not only from the relative position of the vehicle but also from a totality of various other factors such as the vehicle azimuth, vehicle velocity and connectability with the last-detected existing link. The detection accuracy is thus greatly improved.

It should be noted that, while both the angle of the vehicle azimuth with respect to the candidate link and the angle of the vehicle azimuth with respect to the passable direction of the candidate link are designated as the evaluation items in the above described embodiment, it is possible to use only one of these angles.

Figure 12:
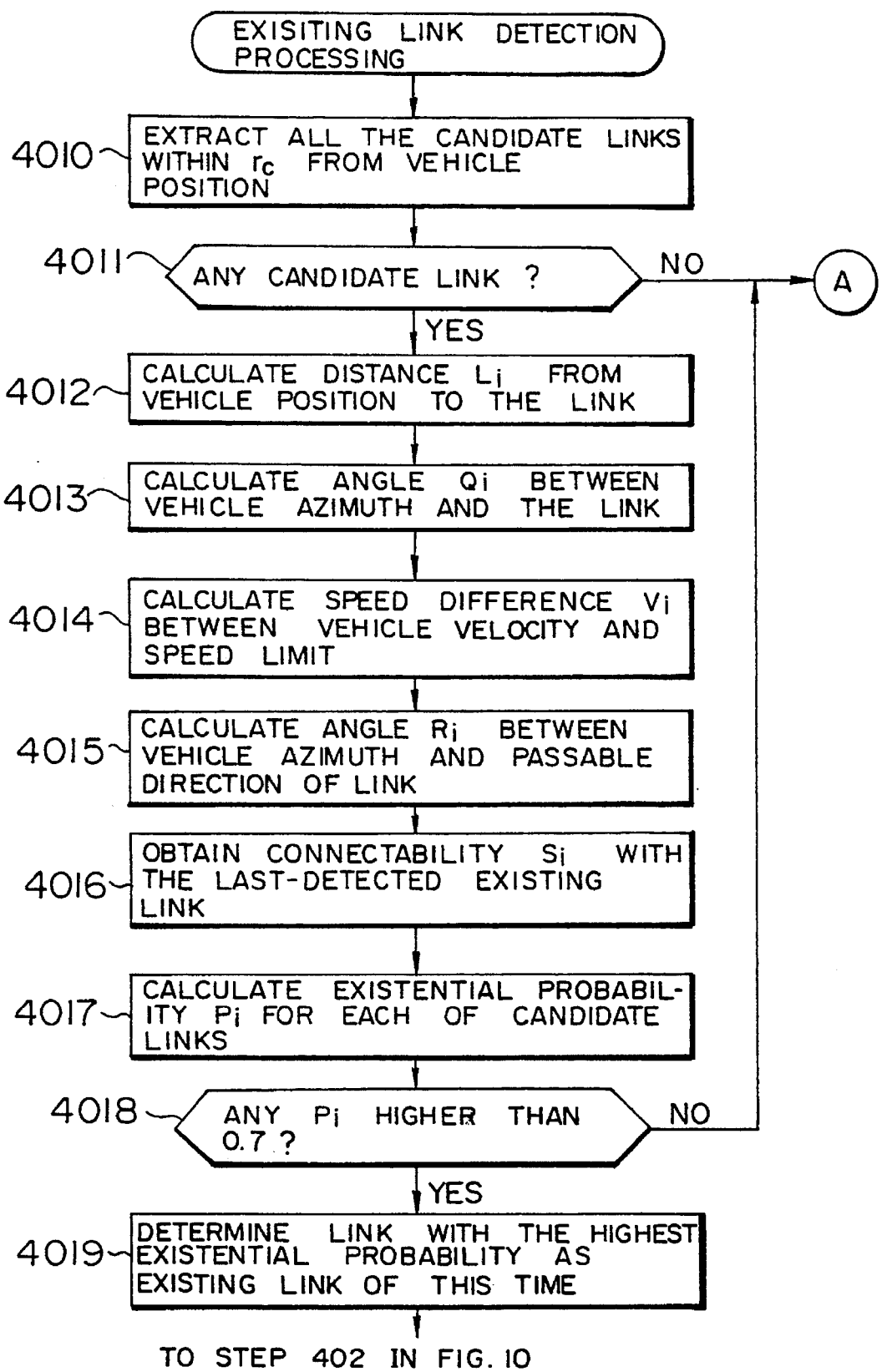
FIG. 12 is a fifth flow diagram showing operation of the navigation controller.

Further, the criterion at Step 4018 in FIG. 12 may be set to a value other than 0.7, for example, to 0.8.

Furthermore, while the ends of a link may be a crossing node or a simple node because an existing link is set as a segment connecting two nodes that are next to each other on a road, the ends of a link may be designated as two crossing nodes that are next to each other on a road, for example, when the optimal route obtained by the route search is formed only of crossing nodes.

Moreover, while it has been described above that data of speed limit and traffic control between nodes and crossing traffic control data at a crossing are previously stored in a CD-ROM which serves as the map information storage medium, it is also possible to use data received at the on-vehicle navigation system from an external system such as a public road traffic information system.

As described, in accordance with the present invention, vehicle position, vehicle azimuth and vehicle velocity are periodically detected during travel. Upon each detection of vehicle position, vehicle azimuth, vehicle velocity, the map data is looked up to extract all the links within a predetermined distance from the vehicle position. For each of the extracted links, obtained are: the distance from the vehicle position to the link; the angle of the vehicle azimuth with the link or/and angle of the vehicle azimuth with the passable direction of the link; the speed difference between the vehicle velocity and the speed limit; and the connectability between the last-detected existing link and the relevant link. These are substituted into a predetermined existential probability evaluation function to calculate an existential probability. The link with the largest existential probability is determined as the existing link. Therefore, detected as the existing link is the link which is determined as most suitable not only from the relative position of the vehicle but also from a totality of various other viewpoints such as of the vehicle azimuth, vehicle velocity and connectability with the last-detected existing link. The detection accuracy is thus greatly improved.

What is claimed is:

1. A method for detecting an existing link of a vehicle for vehicle navigation, the existing link being a road segment on which the vehicle is currently located, comprising the steps of:

receiving at the vehicle positioning signals;

determining vehicle position, vehicle azimuth, and vehicle velocity from the received signals;

for each determination of the vehicle position, vehicle azimuth and vehicle velocity:

(a) extracting all the links within a predetermined distance of the vehicle position by looking up road data;

(b) for each of the extracted links, obtaining information representing a relation between the vehicle position and the extracted link based on said vehicle position, vehicle azimuth and vehicle velocity relative to a speed limit of the link;

(c) substituting the obtained information into an existential probability evaluation function to calculate an existential probability;

(d) determining a link with the largest existential probability to be the existing link; and (e) indicating a location of the vehicle to be on the existing link.

2. A method for detecting an existing link of a vehicle for vehicle navigation, the existing link being a road segment on which the vehicle is currently located, comprising the steps of:

receiving at the vehicle positioning signals;

determining vehicle position, vehicle azimuth, and vehicle velocity from the received signals;

for each determination of the vehicle position, vehicle azimuth and vehicle velocity:

(a) extracting all the links within a predetermined distance from the vehicle position by looking up road data;

(b) for each of the extracted links, obtaining: a distance from the vehicle position to the link; an angle formed between the vehicle azimuth and the link; a speed difference between the vehicle velocity and the speed limit of the link; and a connectability between a last-detected existing link and a present link;

(c) substituting the results of step (b) into a predetermined existential probability evaluation function to calculate an existential probability;

(d) determining a link with the largest existential probability to be the existing link; and (e) indicating a location of the vehicle to be on the existing link.

3. A method for detecting the existing link of a vehicle according to claim 2, wherein said existential probability evaluation function is a sum of the distance, the angle, the speed difference, and the connectability.

4. A method for detecting the existing link of a vehicle according to claim 2, wherein, if said existential probability is lower than a predetermined value, determination of the existing link with respect to the vehicle position is not performed.

5. A method for detecting the existing link of a vehicle according to claim 2, wherein said distance from the vehicle position to the link is calculated as the length of a perpendicular drawn from the vehicle position to the link.

6. A method for detecting the existing link of a vehicle according to claim 2, wherein said first angle formed between the vehicle azimuth and the link is obtained by measuring the direction of the link with respect to the vehicle azimuth.

7. A method for detecting the existing link of a vehicle according to claim 2, wherein said angle between the vehicle azimuth and the link is obtained by measuring a passable direction of the link with respect to the vehicle azimuth.

8. A method for detecting the existing link of a vehicle according to claim 7, wherein said passable direction of the link is the direction along which travel is permitted according to traffic control data in the road data.

9. A method for detecting the existing link of a vehicle according to claim 8, wherein, if no traffic control data exists for the link, the angle between the vehicle azimuth and the passable direction of the link is obtained by measuring the direction of the link with respect to the vehicle azimuth without regard to the passable direction of the link.

10. A method for detecting the existing link of a vehicle according to claim 2, wherein said connectability between the detected existing link and the present link is obtained on the basis of a crossing traffic control data and a traffic control data.

11. A method for detecting the existing link of a vehicle according to claim 2, wherein said speed limit, traffic control data and crossing traffic control data are obtained from a system external to the vehicle.

12. A method for detecting an existing link of a vehicle for vehicle navigation, the existing link being a road segment on which the vehicle is currently located, comprising the steps of:

receiving at the vehicle positioning signals;

determining vehicle position, vehicle azimuth, vehicle velocity from the received signals;

for each determination of the vehicle position, vehicle azimuth and vehicle velocity;

extracting all the links within a predetermined distance from the vehicle position by looking up road data;

for each of the extracted links obtaining the length of a perpendicular drawn from the vehicle position to the link as a distance from the vehicle position to the link;

measuring the direction of the link with respect to the vehicle azimuth to obtain a first angle formed between the vehicle azimuth and the link; measuring a passable direction of the link with respect to the vehicle azimuth to obtain a second angle between the vehicle azimuth and the passable direction of the link, wherein the passable direction of the link is the direction along which travel is permitted;

obtaining a speed difference between the vehicle velocity and the speed limit of the link; and obtaining a connectability between a last-detected existing link and a present link on the basis of crossing traffic control data and traffic control data;

substituting the length, the first angle, the second angle, the speed difference and the connectability into a predetermined existential probability evaluation function to calculate an existential probability;

determining a link with the largest existential probability to be the existing link; and indicating a location of the vehicle to be on the existing link.

13. A method for detecting the existing link of a vehicle according to claim 12, wherein said existential probability evaluation function is a sum of the length, the first angle, the second angle, the speed difference, and the connectability.

14. A vehicle navigation system comprising:

a receiver for receiving positioning signals;

means for determining vehicle position, vehicle azimuth, vehicle velocity from the received signals;

means for extracting all road segment links within a predetermined distance of the determined vehicle position by looking up road data and, for each of the extracted links, for obtaining parameters for: a distance from the vehicle position to the link; an angle formed between the vehicle azimuth and the link; a speed difference between the vehicle velocity and the speed limit of the link; and a connectability between a last-detected existing link and a present link;

means for substituting the parameters into a predetermined existential probability evaluation function to calculate an existential probability and for determining a link with the largest existential probability to be the existing link; and means for indicating that the vehicle is located on the existing link.

15. A navigation system according to claim 14, wherein said existential probability evaluation function is a sum of the distance, the angle, the speed difference, and the connectability.

16. A route guiding method for a vehicle obtaining guide route data for an optimal route connecting a start point to a destination by looking up road data containing a crossing network list, said route guiding method comprising the steps of:

receiving positioning signals at the vehicle;

determining vehicle position, vehicle azimuth, vehicle velocity from the received signals;

for each determined vehicle position, vehicle azimuth and vehicle velocity:

extracting all road segment links within a predetermined distance from the determined vehicle position by looking up the road data;

for each of the extracted links obtaining: a distance from the vehicle position to the link; an angle formed between the vehicle azimuth and the link; a speed difference between the vehicle velocity and the speed limit of the link; and a connectability between a last-detected existing link and a present link; and substituting the distance, the angle, the speed difference, and the connectability into a predetermined existential probability evaluation function to calculate an existential probability;

determining a link with the largest existential probability to be the existing link;

comparing link information on the existing link and said guide route data to determine whether the vehicle has deviated from the guide route or not; and indicating whether the vehicle has so deviated.

17. A route guiding method according to claim 16, wherein said existential probability evaluation function is a sum of the distance, the angle, the speed difference, and the connectability.

18. A route guiding method according to claim 16, wherein said link information comprises longitude-latitude coordinates of the two nodes at the two ends of the existing link.

19. A route guiding method according to claim 16, wherein the vehicle is determined as traveling on the guide route if the nodes at each end of the existing link are included in the nodes constituting the guide route data and wherein the vehicle is determined as having deviated from the guide route if either of the nodes at the two ends of the existing link is not included in the nodes constituting the guide route.

20. A route guiding method according to claim 16, wherein a warning is issued when the vehicle is determined as having deviated from the guide route.

21. A method for detecting an existing link of a vehicle for purposes of vehicle navigation, the existing link being a road segment on which the vehicle is currently located, comprising the steps of:

receiving positioning signals at the vehicle;

determining vehicle position, vehicle azimuth, and vehicle velocity from the received signals;

for each determined vehicle position, vehicle azimuth and vehicle velocity:

(a) extracting all road segment links within a predetermined distance of the vehicle position by looking up road data;

(b) for each of the extracted links, obtaining: a distance from the vehicle position to the link; and an angle formed between the vehicle azimuth and the link; wherein said angle between the vehicle azimuth and the link is obtained by measuring a passable direction of the link with respect to the vehicle azimuth, and wherein said passable direction of the link is the direction along which travel is permitted by traffic control data in the road data;

(c) substituting the results of steps (b) into a predetermined existential probability evaluation function to calculate an existential probability;

(d) determining a link with the largest existential probability to be the existing link; and (d) indicating a location of the vehicle to be on the existing link.

22. A vehicle navigation system comprising:

a receiver for receiving positioning signals;

means for determining vehicle position, vehicle azimuth, vehicle velocity from the received signals;

means for extracting all road segment links within a predetermined distance of the determined vehicle position by looking up road data and, for each of the extracted links, for obtaining parameters for: a distance from the vehicle position to the link; an angle formed between the vehicle azimuth and a direction along which travel is permitted on the link; and a connectability between the last-determined existing link on which the vehicle was located and the present link;

means for substituting the parameters into a predetermined existential probability evaluation function to calculate an existential probability and for determining a link with the largest existential probability to be the existing link; and means for indicating that the vehicle is located on the existing link.

* * * * *